(12) United States Patent
Prescott et al.

(10) Patent No.: US 12,246,815 B2
(45) Date of Patent: *Mar. 11, 2025

(54) BALLOON SYSTEM AND/OR METHOD FOR BALLOON STAND-UP

(71) Applicant: Space Perspective Inc., Kennedy Space Center, FL (US)

(72) Inventors: Jacquie Prescott, Titusville, FL (US); Ryan Nascimento, Kennedy Space Center, FL (US); Taber MacCallum, Kennedy Space Center, FL (US); Manasi Palwankar, Kennedy Space Center, FL (US)

(73) Assignee: Space Perspective Inc., Kennedy Space Center, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,742

(22) Filed: Apr. 17, 2024

(65) Prior Publication Data
US 2024/0262484 A1 Aug. 8, 2024

Related U.S. Application Data

(63) Continuation of application No. 18/389,151, filed on Nov. 13, 2023, now Pat. No. 11,993,359, which is a continuation-in-part of application No. 18/220,165, filed on Jul. 10, 2023, now abandoned, which is a continuation of application No. 18/084,410, filed on
(Continued)

(51) Int. Cl.
| | | |
|---|---|---|
| *B64B 1/44* | (2006.01) | |
| *B64B 1/40* | (2006.01) | |
| *B64B 1/64* | (2006.01) | |
| *B64D 1/12* | (2006.01) | |
| *B64D 11/00* | (2006.01) | |
| *B64D 17/18* | (2006.01) | |

(52) U.S. Cl.
CPC ............ *B64B 1/44* (2013.01); *B64B 1/40* (2013.01); *B64B 1/64* (2013.01); *B64D 1/12* (2013.01); *B64D 11/00* (2013.01); *B64D 17/18* (2013.01); *B64D 2011/0061* (2013.01)

(58) Field of Classification Search
CPC .............. B64B 1/40; B64D 1/12; B64D 11/00
See application file for complete search history.

(56) References Cited

U.S. PATENT DOCUMENTS

| | | |
|---|---|---|
| 2,900,147 A | 8/1959 | Huch et al. |
| 3,041,019 A | 6/1962 | Froehlich |
| (Continued) | | |

OTHER PUBLICATIONS

Prescott, Jacquie, et al., "Balloon System and/or Method for Balloon Stand-Up", U.S. Appl. No. 18/389,151, filed Nov. 13, 2023.

*Primary Examiner* — Justin M Benedik
(74) *Attorney, Agent, or Firm* — Jeffrey Schox; Evan Myers

(57) ABSTRACT

The system 100 can include a balloon system 110 and a set of spools 120. The system can optionally include a set of actuators 130. However, the system 100 can additionally or alternatively include any other suitable set of components. The system can function to facilitate balloon launch preparation and/or launch of a balloon vehicle system. The system can additionally function to facilitate controlled stand-up of a balloon.

20 Claims, 23 Drawing Sheets

Related U.S. Application Data

Dec. 19, 2022, now Pat. No. 11,753,136, which is a continuation of application No. 17/356,328, filed on Jun. 23, 2021, now Pat. No. 11,560,210, which is a continuation of application No. 17/164,668, filed on Feb. 1, 2021, now Pat. No. 11,072,410.

(60) Provisional application No. 62/969,447, filed on Feb. 3, 2020, provisional application No. 63/424,537, filed on Nov. 11, 2022, provisional application No. 63/447,295, filed on Feb. 21, 2023.

(56) References Cited

U.S. PATENT DOCUMENTS

| | | | |
|---|---|---|---|
| 3,090,585 | A | 5/1963 | Church |
| 4,402,476 | A | 9/1983 | Wiederkehr |
| 4,651,956 | A | 3/1987 | Winker et al. |
| 6,234,425 | B1 | 5/2001 | Rand et al. |
| 6,830,222 | B1 | 12/2004 | Nock et al. |
| 9,242,712 | B1 | 1/2016 | Ratner |
| 9,540,091 | B1 | 1/2017 | MacCallum et al. |
| 9,568,918 | B1 | 2/2017 | Perry |
| 9,694,910 | B2 * | 7/2017 | MacCallum ............. B64B 1/02 |
| 11,072,410 | B1 | 7/2021 | MacCallum |
| 2006/0000945 | A1 | 1/2006 | Voss |
| 2016/0264248 | A1 | 9/2016 | MacCallum et al. |
| 2017/0129579 | A1 | 5/2017 | De Jong |
| 2017/0297724 | A1 | 10/2017 | Leidich et al. |
| 2017/0331177 | A1 | 11/2017 | MacCallum et al. |
| 2017/0349291 | A1 | 12/2017 | MacCallum et al. |

* cited by examiner

BALLOON SYSTEM AND/OR METHOD FOR BALLOON STAND-UP

CROSS REFERENCE TO RELATED APPLICATIONS

This application is a continuation of U.S. application Ser. No. 18/389,151, filed 13 Nov. 2023, which claims the benefit of U.S. Provisional Application No. 63/447,295, filed 21 Feb. 2023, and U.S. Provisional Application No. 63/424,537, filed 11 Nov. 2022, each of which is incorporated herein in its entirety by this reference.

U.S. application Ser. No. 18/389,151, filed 13 Nov. 2023, is a continuation-in-part of U.S. application Ser. No. 18/220,165, filed 10 Jul. 2023, titled "AEROSPACE BALLOON SYSTEM AND METHOD OF OPERATION", which is a continuation of U.S. patent application Ser. No. 18/084,410, filed 19 Dec. 2022, which is a continuation of U.S. patent application Ser. No. 17/356,328, filed 23 Jun. 2021, which is a continuation of U.S. patent application Ser. No. 17/164,668, filed 1 Feb. 2021, which claims the benefit of U.S. Provisional Application Ser. No. 62/969,447, filed 3 Feb. 2020, each of which is incorporated in its entirety by this reference.

TECHNICAL FIELD

This invention relates generally to the aerospace vehicle field, and more specifically to a new and useful balloon system and/or method for balloon stand-up in the aerospace vehicle field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
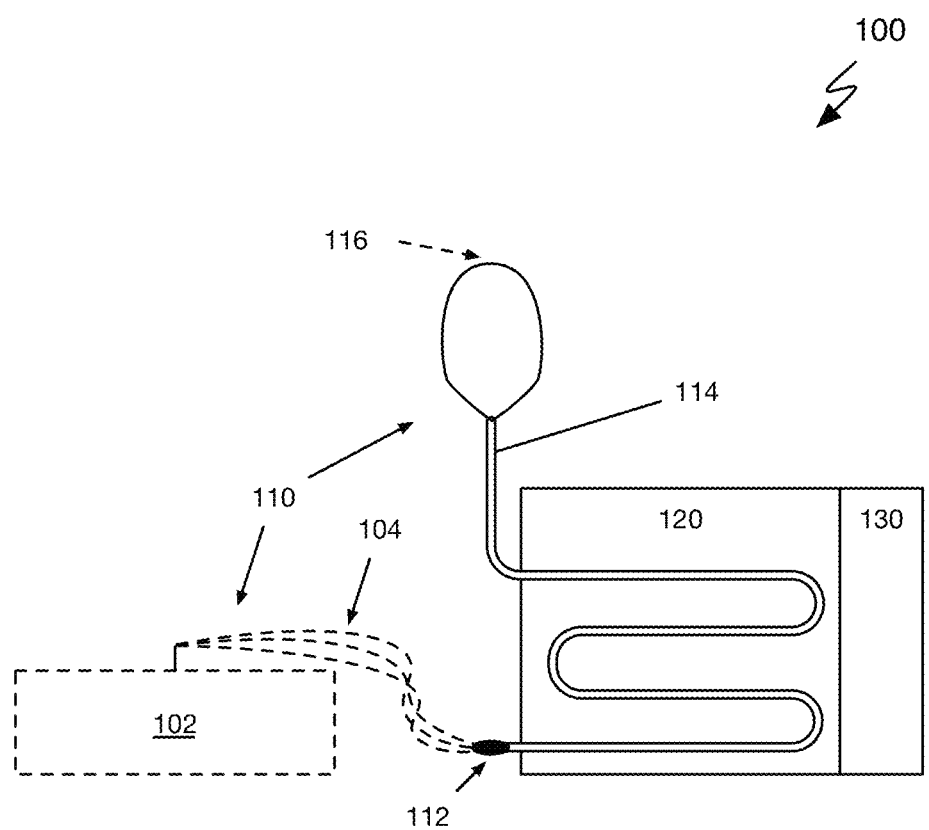
FIG. 1 is a schematic representation of a variant of the system.

The system 100, an example of which is shown in FIG. 1, can include a balloon system 110 and a set of spools 120. The system can optionally include a set of actuators 130. However, the system 100 can additionally or alternatively include any other suitable set of components. The system can function to facilitate balloon launch preparation and/or launch of a balloon vehicle system. Additionally or alternatively, the system can function to facilitate controlled stand-up of a balloon.

Figure 2:
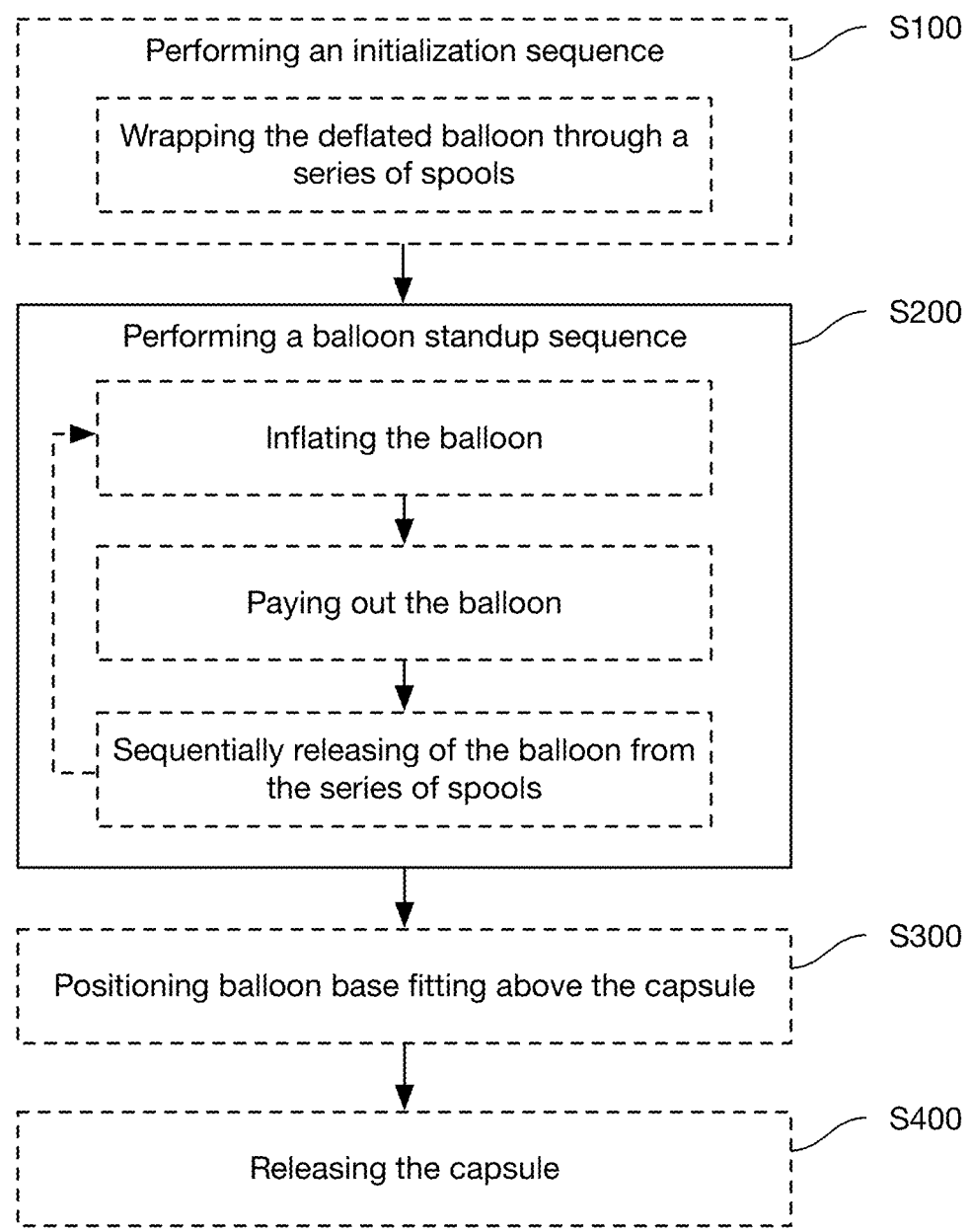
FIG. 2 is a flowchart diagrammatic representation of a variant of the method.

The method, an example of which is shown in FIG. 2, can include: performing a balloon stand-up sequence S200. Additionally, the method can optionally include: performing an initialization sequence S100; positioning balloon base fitting above the capsule S300; and releasing the capsule S400. However, the method S100 can additionally or alternatively include any other suitable elements.

The method and/or a balloon stand-up sequence thereof can be used to deploy a balloon from a vehicle, such as an ocean-going vessel or other watercraft. The system can be integrated with the vehicle, installed onboard the vehicle, and/or otherwise implemented in conjunction with the vehicle. Variants of the method are preferably performed while the vehicle is at sea, but can additionally or alternatively be performed while the vehicle is docked and/or in any other suitable position. More preferably, the method can be performed with the vehicle navigating with substantially with the same velocity as ambient wind (e.g., exactly the same, offset by about 1 knot; excluding wind changes, gusts, or perturbations), but can additionally or alternatively be performed with the vehicle outpacing the wind speed (e.g., 1 knots faster than average wind speed, 2 knots faster than average wind speed, etc.), traveling slower than the wind speed, traveling at an angle relative to the wind direction (e.g., yaw angle relative to the wind can less than 6 degrees, less than a max yaw angle of the spool yaw adjustment mechanism, etc.; with a relative yaw angle of: less than 1 degree, 1 degree, 3 degrees, 5 degrees, 6 degrees, 8 degrees, greater than 8 degrees, any open or closed range bounded by the aforementioned values, and/or any other suitable yaw angle[s] relative to the wind), and/or can be otherwise navigated/controlled during execution of the method and/or sub-elements thereof.

The term "roller" or "roller spool" preferably refers to a cylindrical roller drum rotatable about its central axis. However, it is understood that, in some variants, rollers can be interchangeably utilized with fixed (non-rotating) spools and/or may be interchangeably referenced herein with the term "spool." Accordingly, the terms "roller" or "roller spool" can be suitably utilized herein to refer to a rotatable spool, small(er) diameter spool, and/or any other suitable type of spool (e.g., fixed position/axis relative to the deck, slidable/translatable relative to the deck, etc.), and/or may refer to any other type of spools. However, the term "roller" can be otherwise suitably referenced herein.

The term "pay out" (or "payed out" or "paying out") as utilized herein, in reference to a balloon, balloon envelope, winch, rope, line, wire, cable, and/or other wound-flexible-tensile-load-bearing component, can refer to the act of letting out the by extending, unwrapping, (partial) slackening, and/or release, which may occur under tension, with control of at least one end, and/or with at least one end uncontrolled (e.g., free and under influence of weight, buoyant force, etc.). Additionally or alternatively, the term "pay out" (or "paying out") may be interchangeably referenced with "play out" (e.g., a generalized idiomatic expression for the same), "lay out" (e.g., in cases where a component is supported by a ground/deck), and/or other suitable term(s). However, the term "pay out" may be otherwise suitably utilized/referenced herein.

The term "hardpoint" as utilized herein preferably refers to an attachment location on a structural frame designed to transfer force and carry an external or internal load. For example, a hardpoint can be a fixed/rigid attachment point on a vehicle (e.g., rigid mounting point on a deck designed to bear external load). However, the term hardpoint can be otherwise suitably referenced herein and/or can be interchangeably referenced as a mount (or mounting point) on a frame or other suitable structure.

The term "substantially" as utilized herein can mean: exactly, approximately, within a predetermined threshold or tolerance, and/or have any other suitable meaning. For example, a 'substantially vertical' axis on a ship may be aligned with a weight vector absent ambient perturbations (e.g., waves), and/or may be within a few degrees of vertical (e.g., zenith angle less than 10 degrees, less than 5 degrees, less than 3 degrees, less than 1 degree, etc.). Similarly, a ship may be controlled to travel with substantially similar velocity to ambient wind velocity, such as with a (rolling) average velocity/direction, within a threshold speed difference (e.g., less than 1 knot, 1 knot, 2 knots, 3 knots, 5 knots, any range bounded by the aforementioned values, etc.), and/or within a threshold number of degrees (e.g., less than 6 degrees, less than 3 degrees, less than 1 degree, etc.). However, the term substantially can be otherwise suitably used/referenced herein.

1.1 Illustrative Examples

Figure 10A:
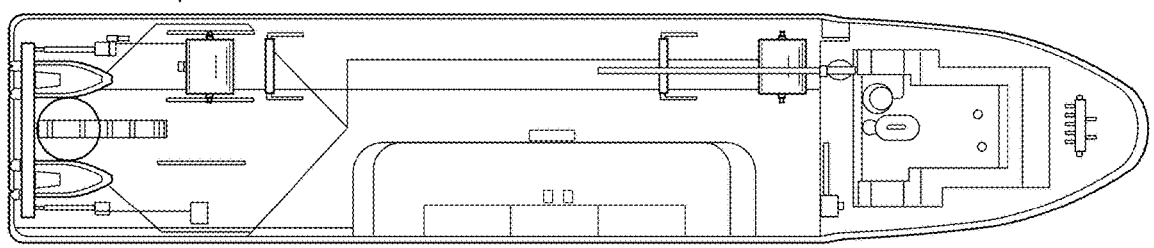
FIGS. 10A-10C are a plan view, a first trimetric view, and a second trimetric view, respectively, of an example system in an initial position, prior to balloon inflation, in a variant of the method.
Figure 10B:
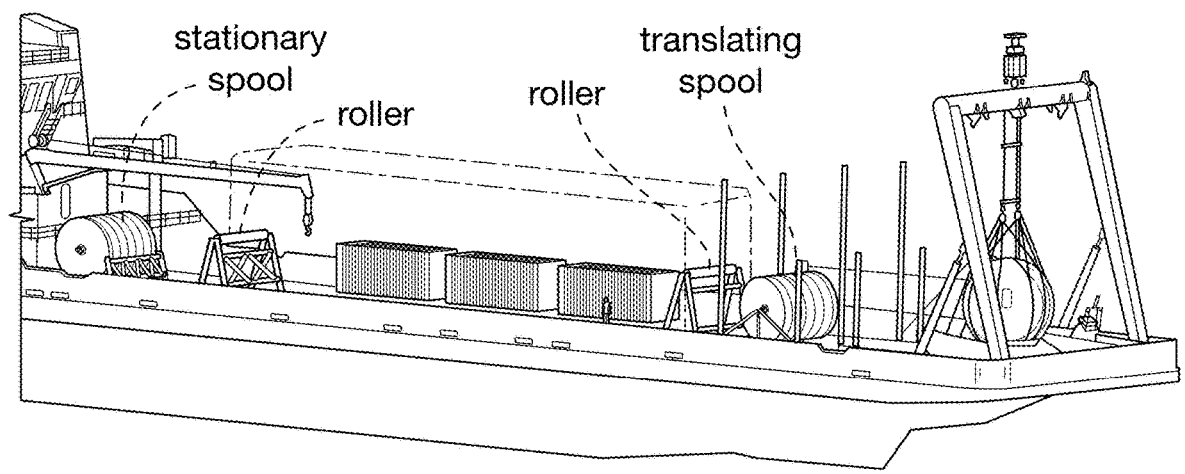
Figure 10C:
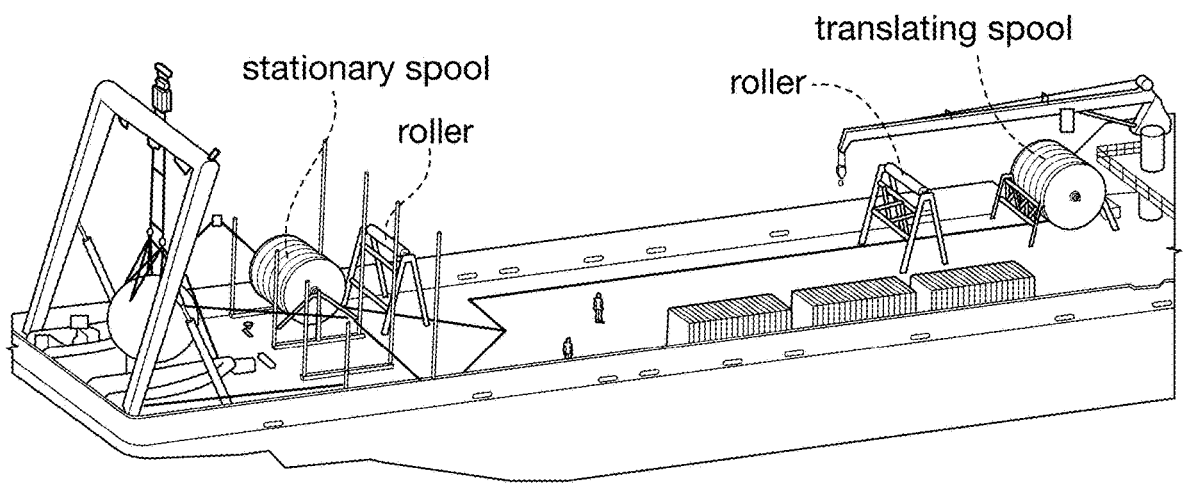

In one embodiment, the balloon is made up of a balloon (envelope) strand that extends from a base fitting at one end to a balloon apex at the opposing end. In the initial position (e.g., an example is shown in FIG. 10A, FIG. 10B, and FIG. 10C), the balloon strand is spooled onto a first (fixed) spool and a translating spool, and extends around two roller spools (e.g., spools rotatable about an axle).

Figure 11A:
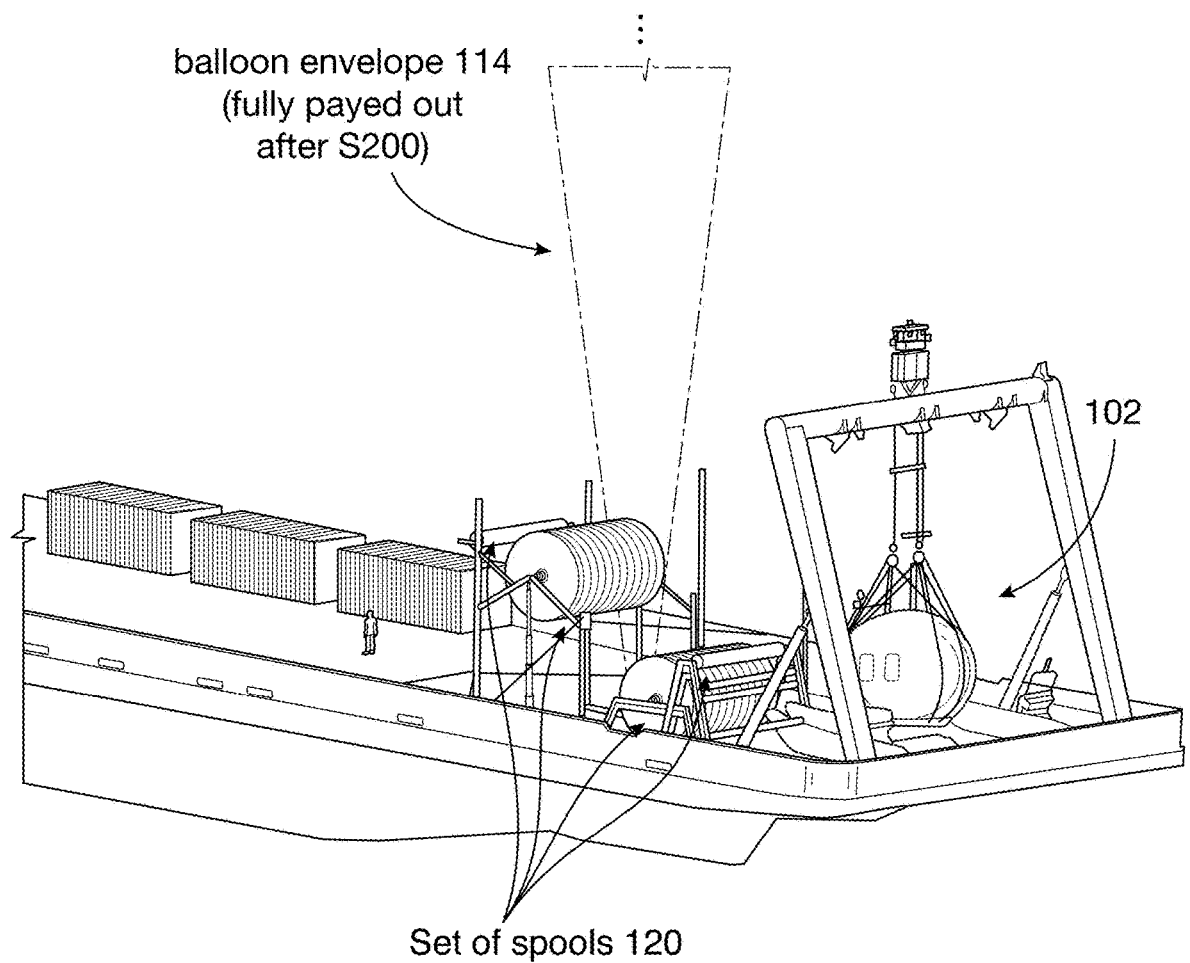
FIGS. 11A-11C are trimetric views of an example system with the balloon inflated, in a variant of the method.
Figure 11B:
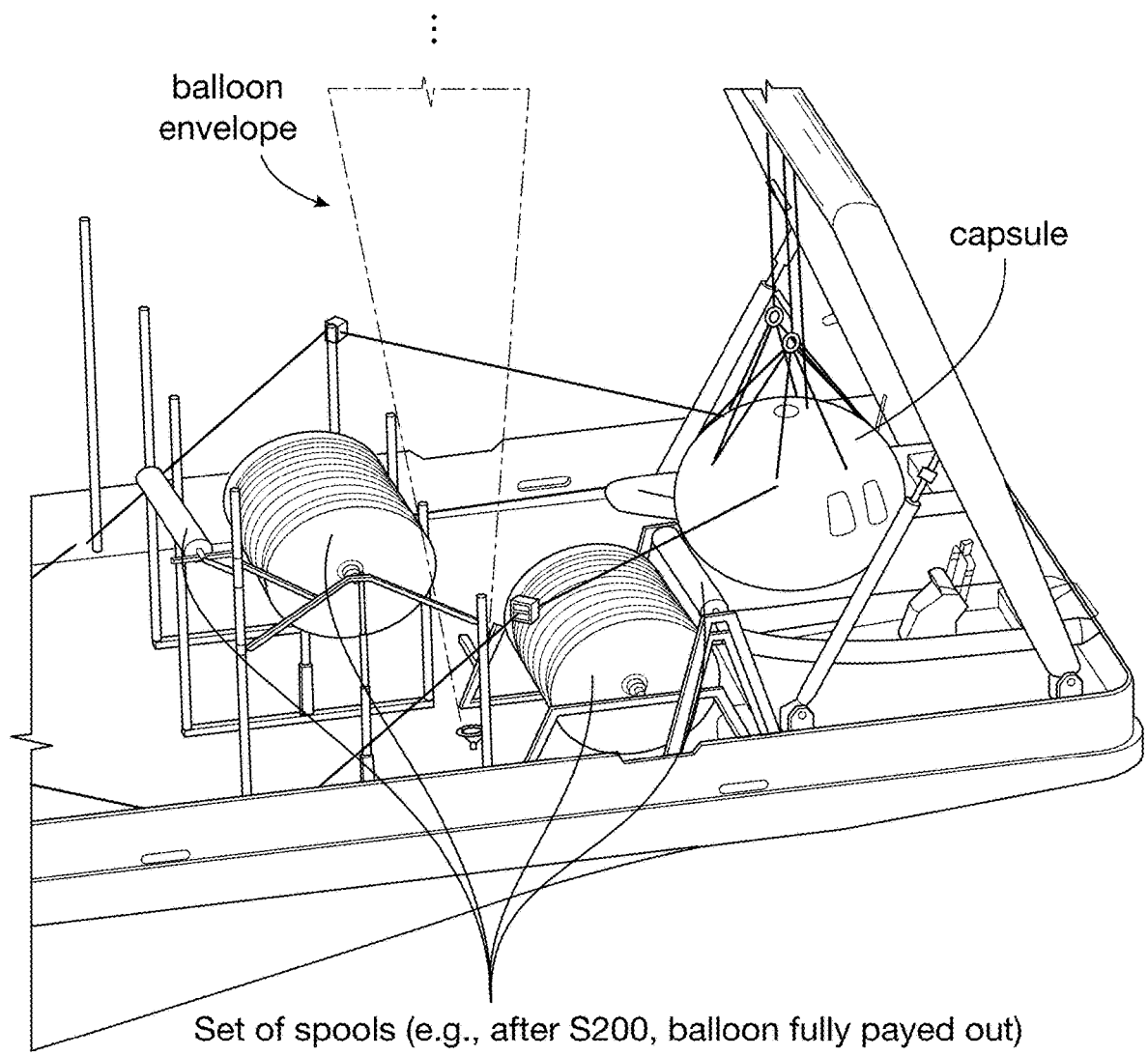
Figure 11C:
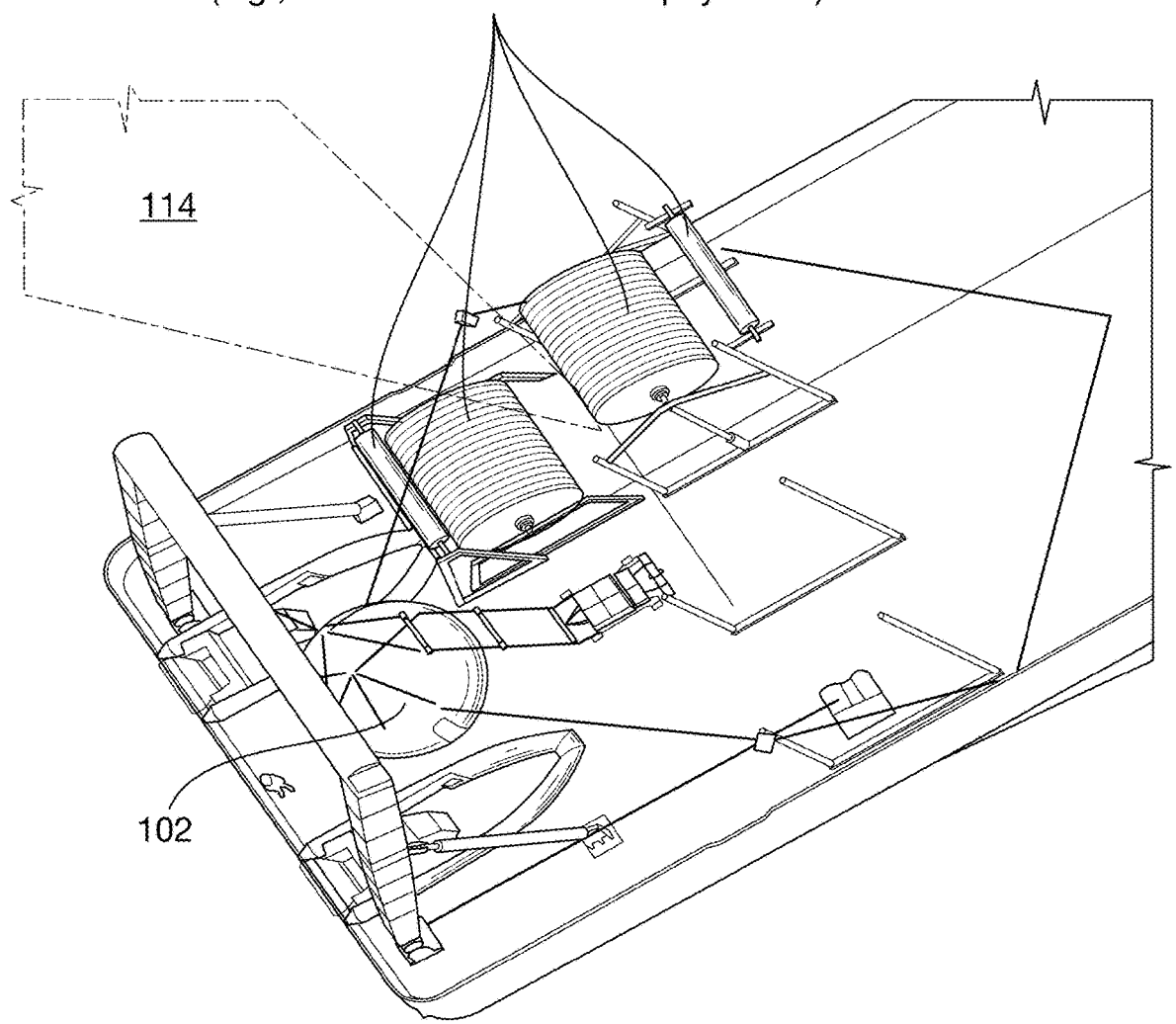
Figure 15A:
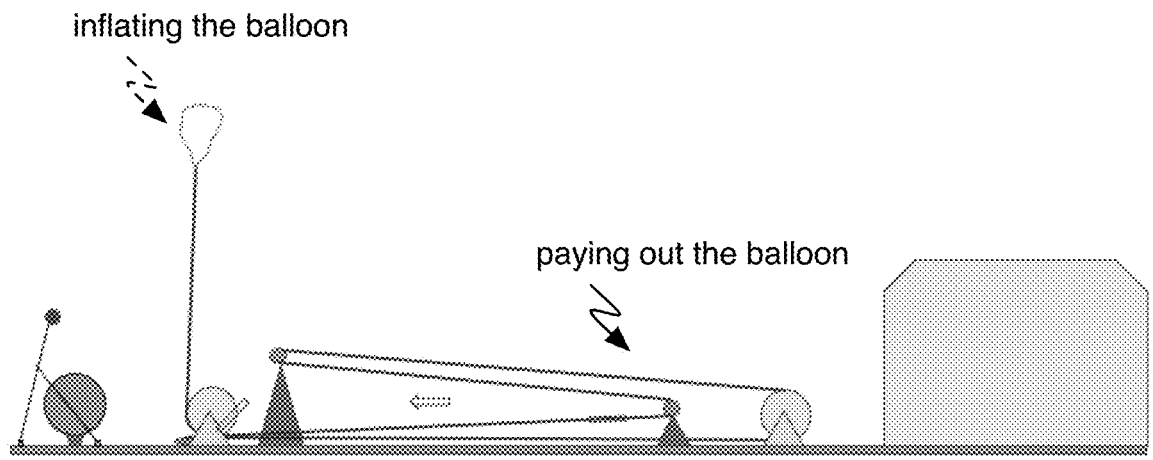
FIGS. 15A-15H are schematic illustrations of an example of the balloon stand-up sequence in a variant of the method.
Figure 15B:
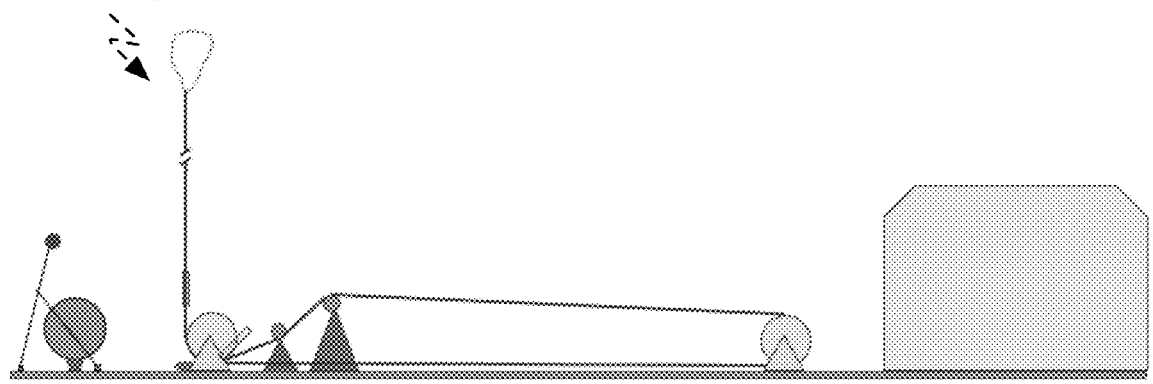
Figure 15C:
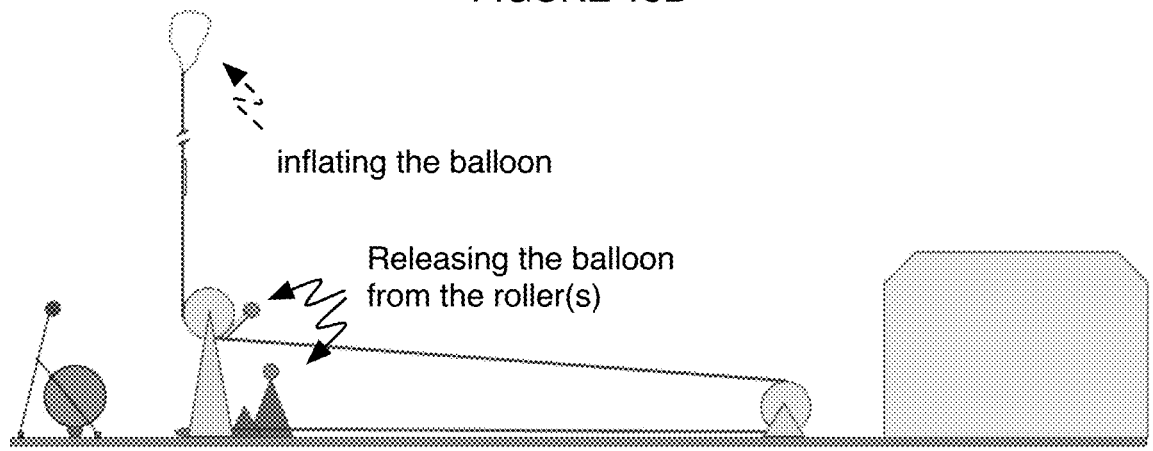
Figure 15D:
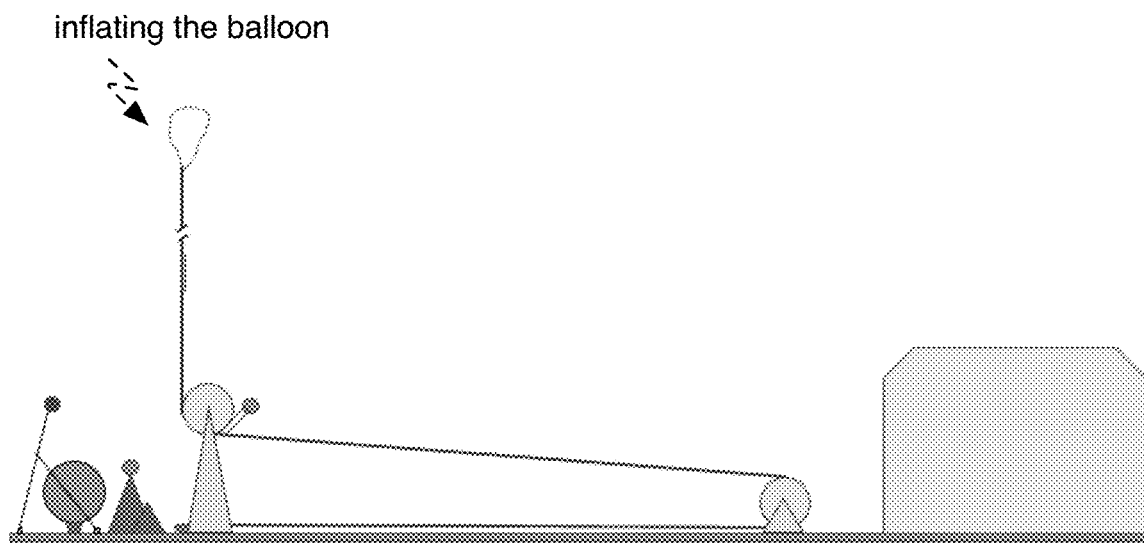
Figure 15E:
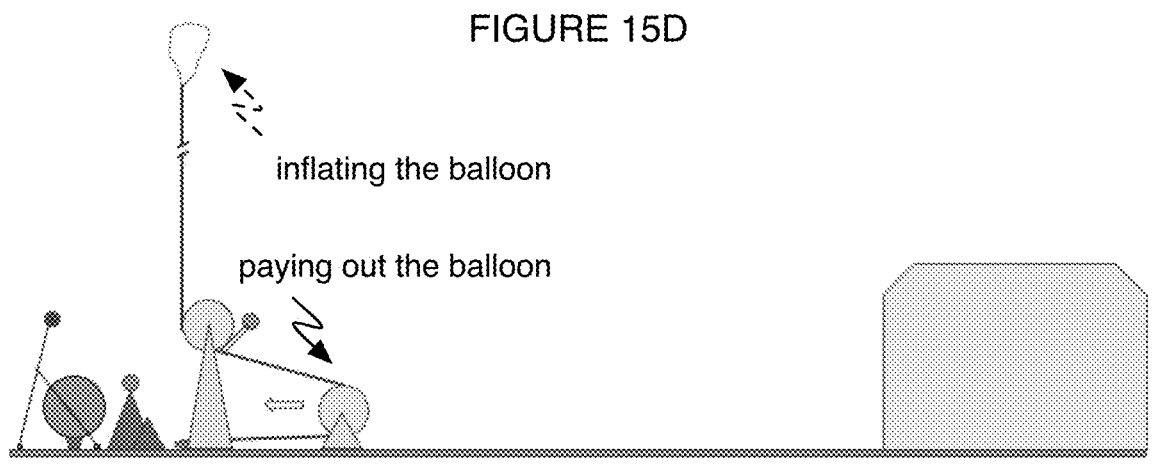
Figure 15F:
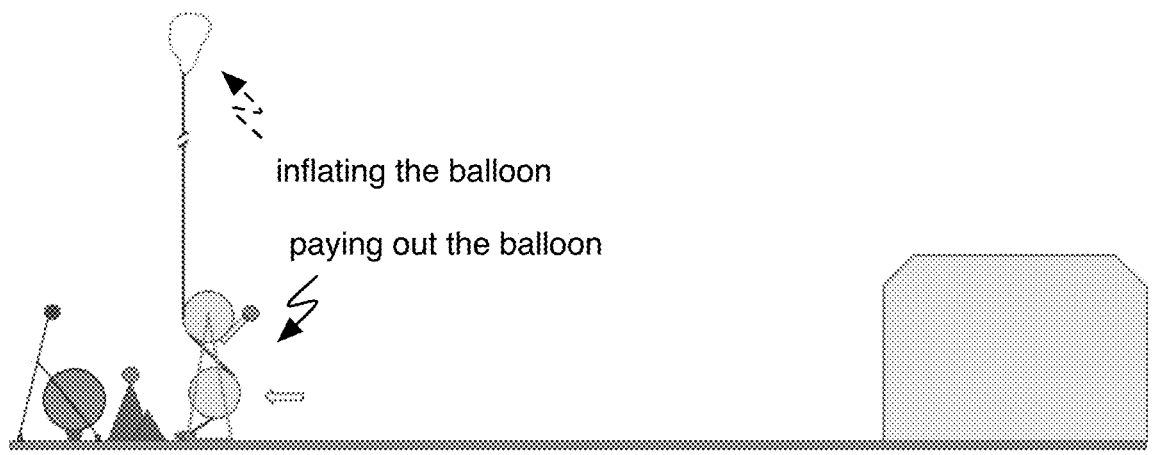
Figure 15G:
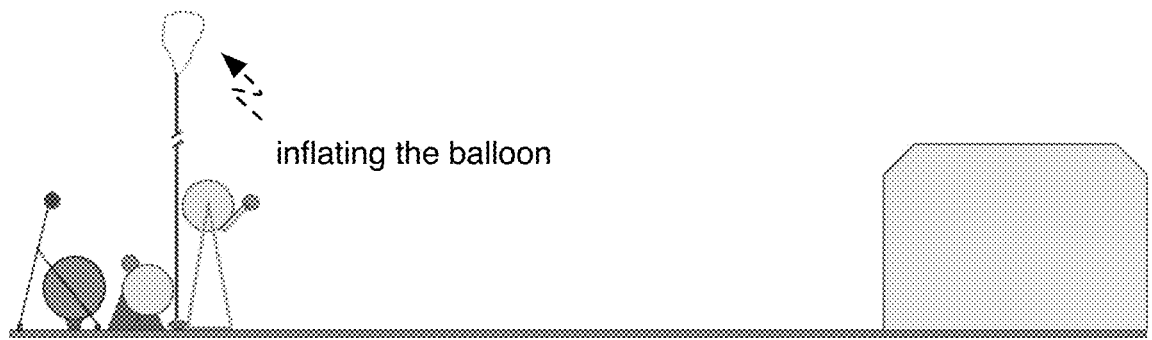
Figure 15H:
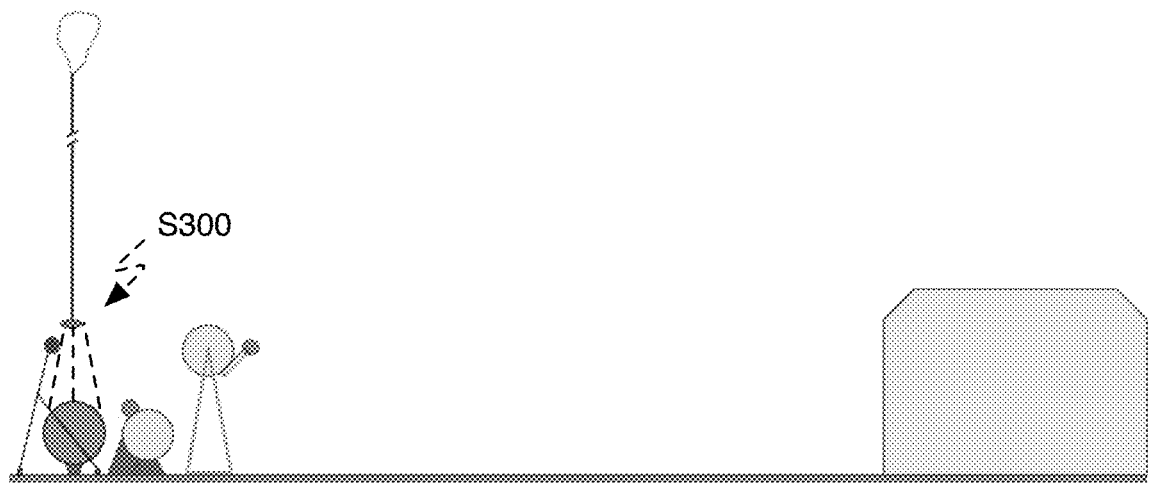

In an example, the inflation sequence begins by filling the balloon by holding the apex fitting up and filling through one or more fill tubes (e.g., an example is shown in FIG. 15A), creating a bubble of lift gas at the balloon apex that generates buoyancy. The buoyancy of the lift gas bubble creates tension though the balloon which causes the forward roller spool to translate towards the fixed spool (e.g., an example is shown in FIG. 15A, moving to the left in 15A), paying out the balloon strand. As the balloon strand continues to pay out, the launch collar remains in place on the balloon strand (e.g., approximately 180 feet from the apex of the balloon). The launch collar can be installed on the balloon prior to that area passing over the fixed spool and will preferably contact only a fixed spool, not any other rollers (e.g., an example is shown in FIG. 15A). As the balloon strand continues to pay out, the forward roller spool passes under the aft roller spool (e.g., an example is shown in FIG. 15B). As the balloon continues to pay out, the fixed spool raises up and captures the translating roller spool with an arm (e.g., an example is shown in FIG. 15C), removing it from its frame and freeing it from any balloon tension. The forward roller spool and translating roller spool frame pass under a fixed spool and nest on the opposite side of the base fitting (e.g., an example is shown in FIG. 15D). As the balloon continues to pay out, the translating spool moves closer to the first spool (e.g., an example is shown in FIG. 15E; a second example is shown in FIG. 15F). When the balloon is fully payed out, it is no longer in contact with any spools or rollers (e.g., an example is shown in FIG. 15G; a second example is shown in an example is shown in FIG. 11A, FIG. 11B, and FIG. 11C). The nadir fitting (a.k.a., base fitting) can be translated above the payload, such as with a crane or second arm, in preparation for launch (e.g., an example is shown in FIG. 15H).

2. Benefits.

Variations of the technology can afford several benefits and/or advantages.

First, variations of this technology can facilitate controlled inflation of a balloon, avoiding damage/tears which may result from the balloon dynamically 'snapping' open as it inflates. In particular, controlled stand-up may be particularly important for larger balloons (e.g., 500 feet in length along a primary axis; where dynamic effects may grow increasingly pronounced with balloon volume and/or deflated balloon length) and/or balloons inflated with a flammable lift gas (e.g., hydrogen; where reducing internal friction internally and/or friction with surroundings during may reduce/mitigate explosion risk). As an example, controlled inflation may avoid damage which may result from incidental contact with the deck, wind disruption, and/or other external influences.

Second, variations of this technology can reduce the necessary footprint by wrapping the balloon though a series of spools (e.g., doubling back the balloon; in a serpentine or boustrophedonic pattern; etc.), which can be particularly advantageous for launches from the deck of a ship, as it may dramatically reduce the size/length of ship required to launch the balloon (e.g., a balloon can be launched from a deck which is shorter than the deflated length of the balloon, less than half the deflated length of the balloon, etc.). Further, launching balloons from a relatively small(er) vessel may allow for greater maneuverability of the vessel, which may in turn facilitate a broader range of launch conditions (e.g., where the vessel may be maneuvered to counteract/reduce the effects of relative wind velocity during balloon launch).

Third, variations of this technology can control balloon yaw angle (e.g., relative to an Earth coordinate frame and/or relative to a deck) during the standup sequence to mitigate crosswind influences. For example, crosswinds (e.g., relative to the deck of the ship and/or long axis of spool translation) may otherwise result in axial translations of the balloon relative to a spool(s) during standup/payout, which may entangle, axially unspool, or damage the balloon. Instead, variants can facilitate granular adjustment of yaw angles by adjusting spool yaw (e.g., minor adjustments within a 12 degree adjustment range) and/or coarse adjusting vessel yaw (i.e., steering ship to align the long axis with the direction of the prevailing wind; major adjustments to any arbitrary wind angle).

However, variations of the technology can additionally or alternately provide any other suitable benefits and/or advantages.

3. System.

The system 100, an example of which is shown in FIG. 1, can include a balloon system 110 and a set of spools 120. The system can optionally include a set of actuators 130.

However, the system 100 can additionally or alternatively include any other suitable set of components. The system can function to facilitate balloon launch preparation and/or launch of a balloon vehicle system. Additionally or alternatively, the system can function to facilitate controlled stand-up of a balloon.

The system 100 and/or spools thereof are preferably constructed with soft goods and/or in conjunction with anti-static coatings and explosion-avoiding materials (e.g., ropes rather than metal cables), which may avoid static buildup or balloon damage if they incidentally contact the balloon. In variants, the balloon may be deployed along a region of the deck which may be coated with a smooth material and/or covered with a cloth or other smooth material, which may reduce a risk of balloon damage, while simultaneously configured to minimize a slip hazard for human workers (e.g., particularly when wet). Additionally, the system is preferably configured to at least partially control the balloon (and/or balloon envelope) during any and/or all phases of the standup and launch sequence to minimize internal and/or external balloon contacts (e.g., which may result in buildup of static charge and tearing risks).

3.1 Balloon System.

The balloon system is preferably a balloon-based aerospace vehicle (e.g., balloon-propelled space capsule), such as a balloon-propelled vehicle configured to operate in the troposphere, stratosphere, and/or any other suitable atmospheric layers. However, the system can additionally or alternatively be any other suitable lighter-than-air vehicle or aerostat (e.g., airship), space vehicle (e.g., spacecraft and/or space capsule), aerodyne (e.g., fixed- and/or rotary-wing aircraft), and/or any other suitable aerospace vehicle. In alternative embodiments, the system can additionally or alternatively function as a terrestrial vehicle, a watercraft, and/or any other suitable vehicle.

The balloon system 110 can include one or more elements of the balloon system as described in U.S. application Ser. No. 17/164,668, filed 1 Feb. 2021, which is incorporated herein in its entirety by this reference. Additionally or alternatively, the balloon system can optionally include one or more elements such as described in U.S. Provisional Patent Application 62/969,447, filed 3 Feb. 2020 and titled "Space Capsule", which is herein incorporated in its entirety by this reference. In examples, the balloon can include one or more elements described in U.S. Provisional Patent Application 62/969,447 regarding the 'Balloon System', the payload can include one or more elements described in U.S. Provisional Patent Application 62/969,447 regarding the 'Capsule System' and/or 'Avionics and Power'. However, the system 100 can additionally or alternatively include any other suitable elements described in U.S. Provisional Patent Application 62/969,447.

The balloon preferably includes an envelope and one or more passive vents, and can optionally include one or more active valves, reefing sleeves, fill tubes, and/or any other suitable elements. The balloon preferably defines an apex 116 and a nadir 112. When the balloon is inflated and in flight, the apex 116 is arranged at (or substantially at) the top of the balloon (e.g., with respect to a gravity vector), and the nadir is arranged at (or substantially at) the bottom/base of the balloon (e.g., opposing the apex across the balloon along or substantially along the gravity vector).

The balloon is preferably a zero-pressure balloon (e.g., configured to maintain a substantially zero-pressure configuration, in which the balloon interior is at substantially the same pressure as the atmosphere surrounding the balloon, while fully and/or substantially-fully inflated; configured not to maintain a substantially greater pressure within the balloon than in the surrounding atmosphere; etc.). However, the balloon can alternatively be a super-pressure balloon or any other suitable type of balloon.

In some embodiments, the balloon (and/or elements thereof, such as the envelope) can include one or more elements such as described in U.S. patent application Ser. No. 17/162,151, filed 29 Jan. 2021 and titled "Aerospace Balloon System and Method of Operation", which is incorporated in its entirety by this reference. For example, the balloon can optionally include an apex fitting and/or nadir fitting (a.k.a., base fitting) such as described in U.S. patent application Ser. No. 17/162,151, and/or the envelope can include one or more gores, load members, and/or reinforcement elements such as described in U.S. patent application Ser. No. 17/162,151.

Figure 9:
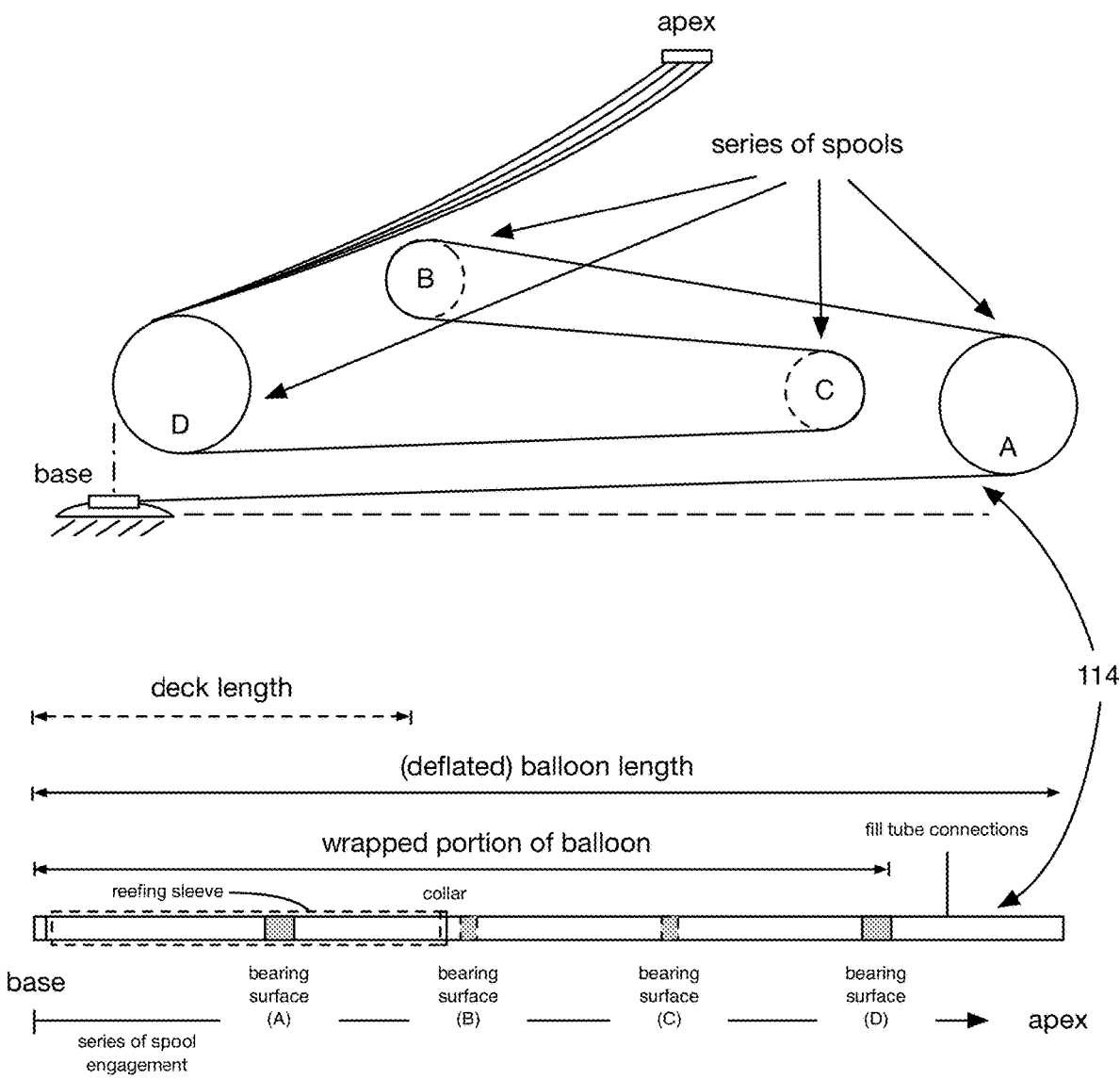
FIG. 9 is a diagrammatic representation of a series of spool engagement in one or more variants of the system and/or method.

The balloon system can include a set of fill tubes which functions to facilitate provision of a lift gas (e.g., hydrogen) to inflate the balloon. The fill tubes are preferably provided proximal to an apex end (e.g., unwrapped portion of the balloon, less than 30 meters from the balloon apex; connected 10-25 meters from the apex, such as about 19 meters from the apex; an example is illustrated in FIG. 9), but can be otherwise arranged. Lift gas is preferably provided via the fill tubes during S200 and/or an initial portion thereof, but can additionally or alternatively be provided with any other suitable timing. For example, in zero-pressure balloon variants, a predetermined volume of lift gas may be provided to partially inflate the balloon during the standup sequence S200, where lift gas expansion in the stratosphere may fully inflate the balloon envelope. After provision of the lift gas via the fill tubes, the fill tubes may be tied off or otherwise sealed (e.g., for a remainder of the standup sequence and/or method).

In a first example, the balloon can be inflated to between 20 and 40% (e.g., 30%) of the total volume before the fill tubes are tied off (e.g., after paying out about 15 meters of wrapped balloon; with the apex at a height of 45-60 meters). In a second example, the fill tubes can be connected between the apex and a collar or reefing sleeve.

However, lift gas can be otherwise provided and/or the balloon can be otherwise configured with any other suitable set of fill tubes.

The balloon system can optionally include or operate in conjunction with one or more payloads 102 (e.g., aerospace capsule). The payload is preferably mechanically connected to the balloon (e.g., by a set of tethers, rigid mechanical connection, ladder train, etc.). The payload is preferably connected to the balloon proximal to the balloon nadir, but can additionally or alternatively be connected in any other suitable location. In some examples, the payload can be selectively connected to (and/or released from) the base fitting, such as during S300. For instance, the balloon system can be operable to transition between a first configuration, wherein the base fitting of the balloon is decoupled from the payload, to a second configuration wherein the payload is mechanically coupled to the base fitting (e.g., by the set of tethers; with the base fitting positioned above the payload by S300). Additionally, the base fitting can be configured to rigidly mount to secure the balloon (e.g., to the deck of a ship, to an actuatable arm, such as may be used to position the base fitting above the payload, etc.).

The payload preferably includes a capsule (e.g., for containing human passengers), but can additionally or alternatively include any other suitable elements. In examples, the payload can include one or more elements such as described in U.S. Provisional Patent Application 62/969,447, filed 3 Feb. 2020 and titled "Space Capsule", which is herein incorporated in its entirety by this reference (e.g., as described in U.S. Provisional Patent Application 62/969,447 regarding the 'Capsule System').

In variants, the balloon can include or be used with a reefing sleeve and/or collar, which functions to constrict the balloon when deflated, during initial inflation, and/or during an initial period of flight (e.g., where the reefing sleeve rips open under expansionary pressure during flight). The reefing sleeve and/or collar may retain lift gas proximal to the apex end of the balloon envelope, which may reduce excess material around the inflated 'bubble' and associated kinking (e.g., which may increase a risk of tearing, static charge buildup, uncontrolled balloon envelope motions, etc.). As an example, the reefing sleeve can constrain the balloon and/or a wrapped portion thereof to a deflated balloon width (e.g., 2 m), which may facilitate controlled stand-up of the balloon in accordance with the method and/or S200 thereof. In a first variant, while wrapped through the series of spools, the reefing sleeve engages at least one of the series of spools (e.g., an example is shown in FIG. 9). In a second variant, nonexclusive from the first, wherein the balloon collar contacts at least one spool while paying out the balloon during S200 (e.g., stationary spool).

The balloon apex 116 is preferably uncontrolled during at least a portion of the standup sequence S200 (i.e., after volume of lift gas bubble is sufficient to raise the apex fitting under lift gas buoyancy), but can additionally be directly controlled or articulated during various portions of the method (e.g., during S100). For example, the balloon apex and/or the apex fitting can be controlled and/or lifted off the deck prior to balloon inflation (and during initial inflation), such as by a crane or actuatable arm. After the volume of lift gas is sufficient to raise the apex, the balloon may passively transition to an upright orientation (e.g., with a central axis of the balloon substantially aligned with gravity and the apex above the last spool contacted in sequence, absent ambient fluid effects; upright above the stationary spool; etc.).

The balloon nadir 112 is preferably coupled and/or fixed to the deck (e.g., at a hardpoint) during the standup sequence. For example, a base fitting of the balloon can be (removably) mounted or fixed to the deck, such as by a clamp, bolted connection, clevis, and/or mechanical coupling/fasteners.

However, the system can include or operate in conjunction with any other suitable balloon system.

3.2 Spools.

The spools 120 function to support, control, and/or secure a wrapped portion of the balloon during the stand-up sequence. Additionally or alternatively, the spools can function to pay out the balloon (e.g., under tension), while controlling the balloon. Additionally or alternatively, the spools can facilitate execution of the method.

Figure 14A:
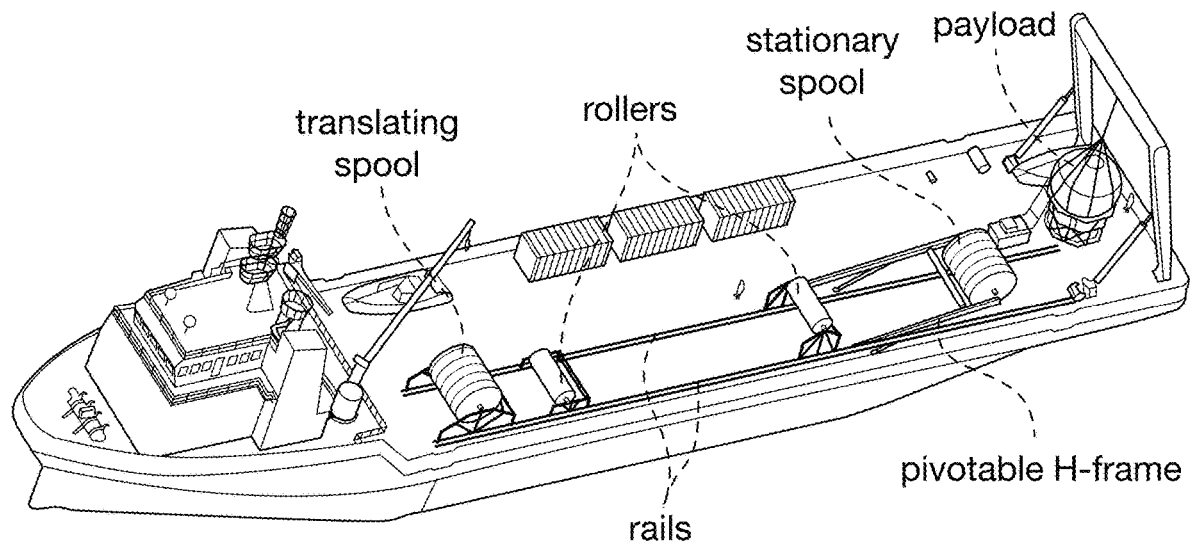
FIGS. 14A-14B are trimetric views of a variant of the system.
Figure 14B:
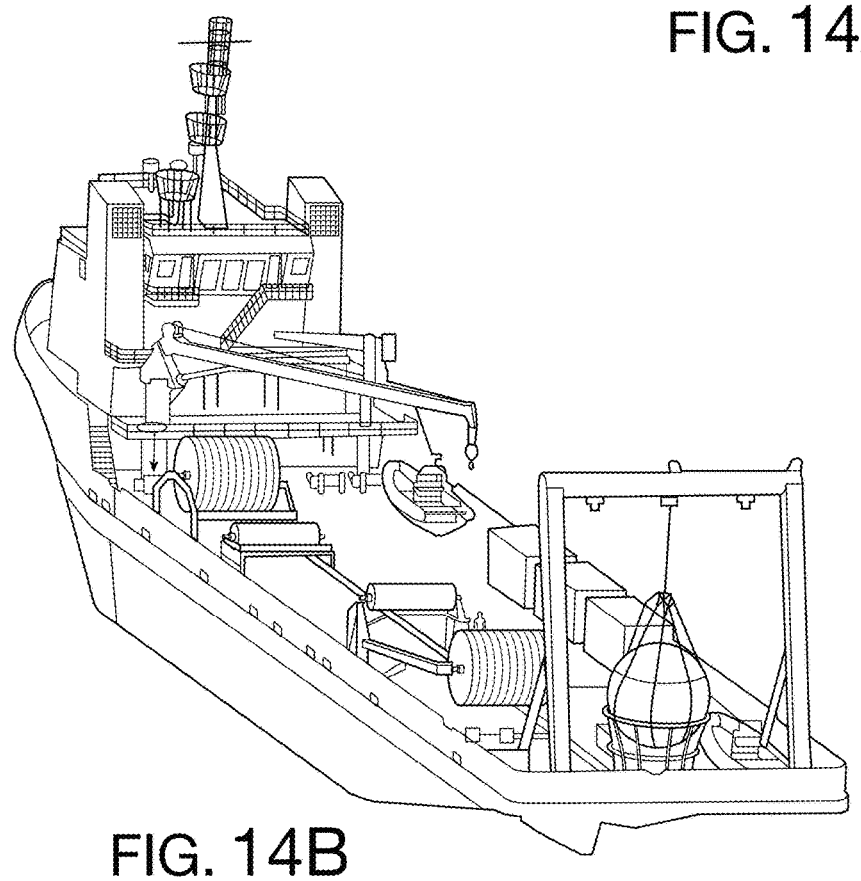

The spools can include: fixed spools, rotatable spools (e.g., rollers), translatable spools, and/or any other suitable spools. Spools can be fixed to the vehicle deck (e.g., mounted to a hard point), slidable/translatable along a set of rails (e.g., via self-lubricating slides/linear carriages, skids, slides, or other suitable mechanisms which utilize Delrin, polytetrafluoroethylene [PTFE], graphite impregnated materials, plastic bearings, rail trucks, and/or any other materials which may avoid buildup of static charge; an example is shown in FIG. 14A and FIG. 14B), and/or supported by a bridle (e.g., controllable by a winch). Translatable spools can be actuated passively (e.g., under balloon tension during inflation), actively (e.g., via winch or linear actuation of a bridle, etc.), manually (e.g., by manual control), and/or can be otherwise actuatable, controllable, or transformable in any suitable degree(s) of freedom.

In variants, spools can include a drum with a diameter sufficiently large to avoid damaging the balloon, based on the tension of the balloon. For example, the diameter of the spools can be: less than 1 meter, 1 meter, 1.5 meters, 2 meters, 2.5 meters, 3 meters, 3.5 meters, 5 meters, larger than 5 meters, any open or closed range bounded by the aforementioned values, and/or any other suitable drum diameter. The length of the spool/drum is preferably larger than the maximum width of the (deflated) balloon. For example, the axial drum length can be about twice the maximum width of the balloon (e.g., 4 meters for a balloon with a maximum deflated width of about 2 meters). The drum length can be: less than 1 meter, 2 meters, 3 meters, 4 meters, 5 meters, greater than 5 meters, any open or closed range bounded by the aforementioned values, and/or any other suitable drum width.

The spool (and/or roller) drums can be coated/covered with a boot made of silicone or another soft material (e.g., with an antistatic coating, low durometer rubber/padding, high durometer rubber/padding, etc.). Alternatively, spools can be coated/cured with resin (e.g., epoxy over aluminum) or another surface finish (e.g., reducing surface imperfections; reduce conductivity and reflectivity of unfinished metal, etc.). However, the system can include any other suitable spool(s) and/or roller(s) with any other suitable construction.

Figure 3A:
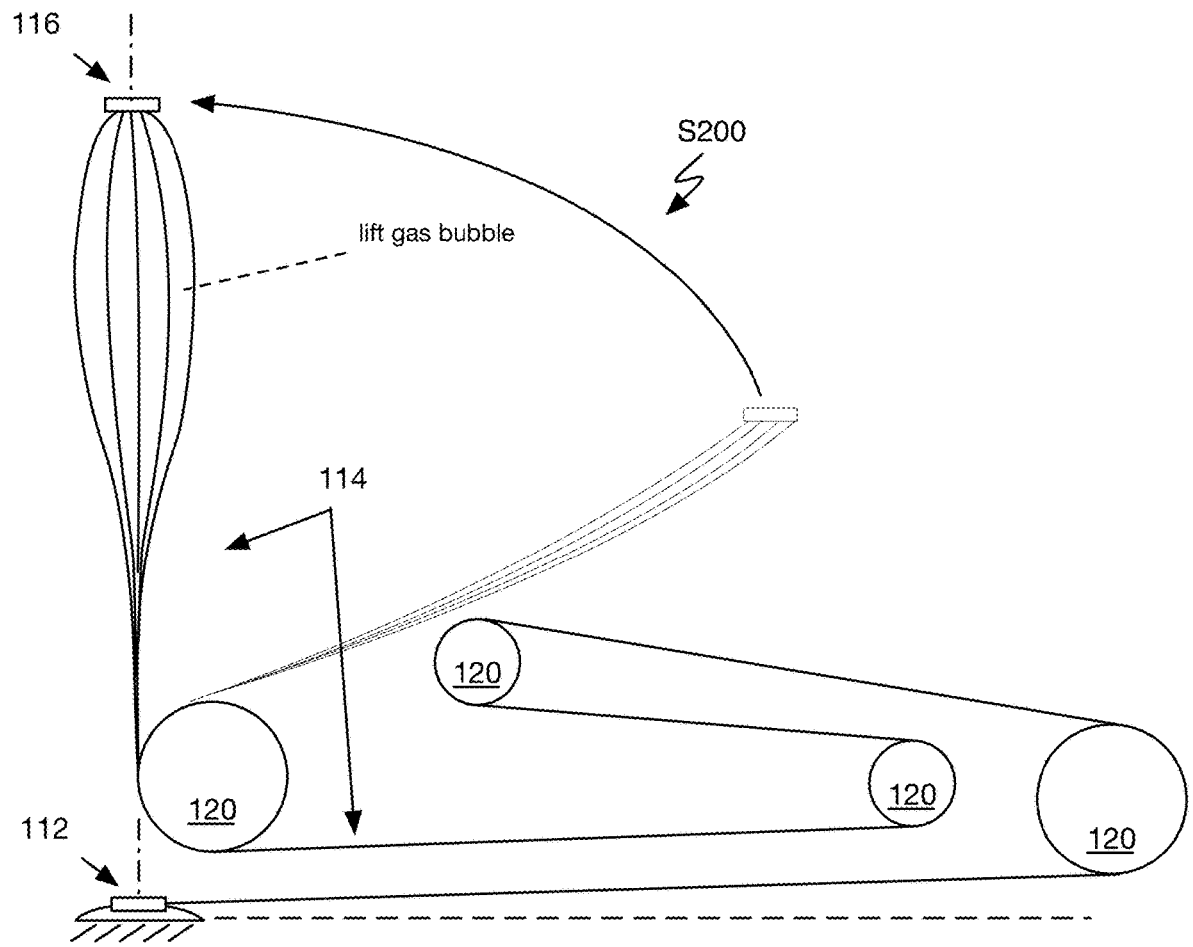
FIGS. 3A-3G are schematic representations of a variant of the balloon stand-up sequence.
Figure 3B:
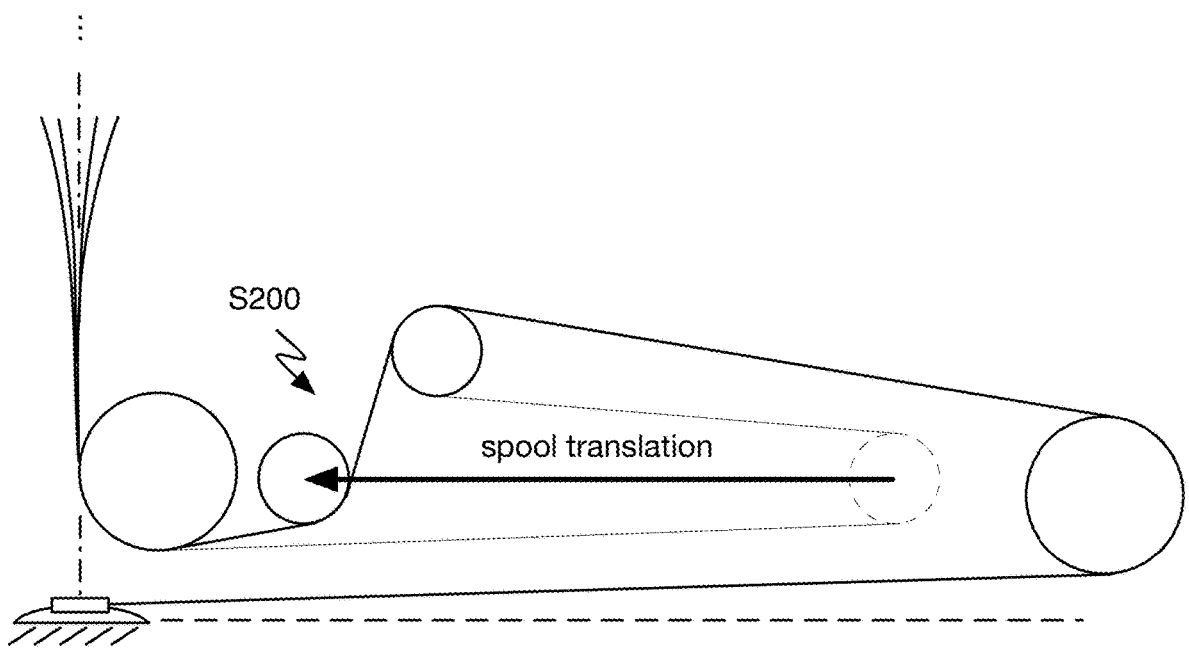
Figure 3C:
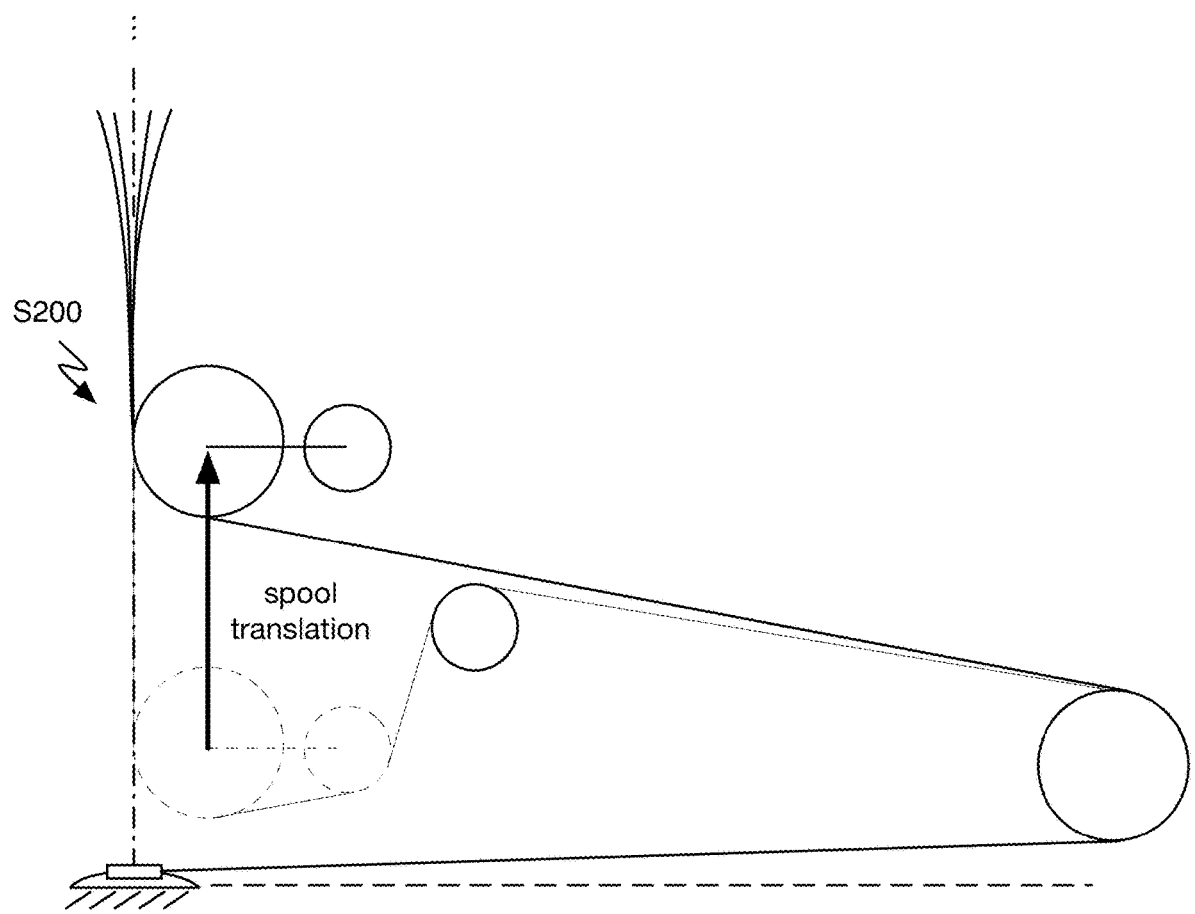

In variants, spools can be supported by a frame structure, which can be fixed (e.g., rigidly mounted to the deck, fixed, etc.), telescoping, pivotable (e.g., an example is shown in FIG. 14A), and/or otherwise actuatable or transformable. Spools and/or frames can be articulated by the set of actuators, such as via a set of arms, along a set of rails (e.g., an example is shown in FIG. 14A and FIG. 14B), and/or otherwise actuatable in any suitable degree(s) of freedom (e.g., yaw adjustable, actuatable along a curved/spiraling/arched path, etc.). As an example, the frame structure can be an A-frame, H-frame, C-frame, and/or have any other suitable geometry. Spools can be individually supported by a frame and/or a frame can be configured to support multiple spools (e.g., an example is shown in FIG. 3C; a second example is shown in FIG. 15C). Spools can be fixed to a frame, rotatable relative to a frame (e.g., for a roller spool, rotatable about a central axis of the spool), actuatable relative to the frame (e.g., in yaw) removably coupled to a frame (e.g., manually, actuatably, etc.), and/or otherwise mounted/attached to a frame(s).

The system 100 preferably includes a plurality of spools configured to collectively wrap and stand-up the balloon in accordance with the method. More preferably, there are exactly 4 spools (e.g., configured to collectively control the balloon in 4 segments), however the set of spools can include one spool, two spools (e.g., an example of such configurations is shown in FIG. 15D and FIG. 15F), three spools, four spools, 5 spools, 6 spools, more than 6 spools, and/or any other suitable number of spools. In a specific example, the system can include 2 larger (non-rotating) spools and 2 smaller rollers (e.g., with drums rotatable about an axis). However, the system 100 can include any suitable number of spools (and/or rollers).

However, the system can include any other suitable set of spool(s).

3.3 Actuators.

The system can optionally include or operate in conjunction with a set of actuators, which functions to articulate the spools and/or balloon (e.g., a balloon base fitting). The set of actuators are preferably hydraulic actuators, but can additionally or alternatively be powered by electrically (e.g., servo or motor actuation, such as an electric winch), pneumatically, and/or can be otherwise suitably powered/actuated. The actuation input provided by the actuator can be linear, rotational, or a combination thereof. The actuators can act in a single direction (e.g., single acting, such as a winch) or bi-directionally (e.g., powered in both directions along an actuation axis; double acting hydraulic actuator). Actuators can have a single actuation end (e.g., with an opposing end fixedly mounted) or multiple actuation ends. The set of actuators can include: actuatable arms (e.g., 1 DOF hydraulic arm; 2 DOF hydraulic arm), winches (e.g., along a set of rails; in one or both directions; in conjunction with a set of lines/rigging), a crane/gantry, yaw actuators (e.g., hinged or pinned about a substantially vertical axis), telescoping spool frames, pivoting spool frames (e.g., rotating about a pitch axis; configured to raise a spool[s]), and/or any other suitable set of actuators or actuation mechanisms. Actuators are preferably manually controlled, but can additionally or alternatively be partially or fully automatic/autonomous, and/or can be otherwise suitably controlled to facilitate execution of the method (and/or subelements thereof).

The set of actuators can be configured to articulate spools and/or balloon in translation (e.g., vertical 'height' translation; longitudinal translation along a long axis of the deck; along a set of linear rails), rotation (e.g., yaw rotation about a yaw axis, rotation about a lateral/pitch axis), and/or any other suitable degrees of freedom. For example, the set of actuators can be configured to translate/regulate the balloon and/or set of spools (and/or spool frames) along any combination/permutation of the translations of S200 (e.g., the examples illustrated in FIGS. 3A-3G).

Additionally or alternatively, in variants the set of actuators can be configured to control and/or regulate motion of the balloon system. For example, spool translation may be partially or fully driven by balloon tension, where an actuator(s) (e.g., winch) may regulate spool translation to control balloon payout. Additionally or alternatively, balloon standup and/or payout may be fully passive and/or fully driven by balloon dynamics during various portions of the method, and/or manually regulated by selectively securing spools (or spool frames) in place (e.g., pinning spools/frames to the deck in liminal positions during the method, such as when another spool is translated).

In one set of variants, the system for balloon standup can include: a set of linear rails mounted to the ship deck and defining a translation axis; a first spool coupled to the set of linear rails and configured to translate along the translation axis of the linear rails; a second spool; a first actuator mounted to the deck and coupled to the second spool, the actuator configured to raise the second spool relative to the deck; a frame coupled to the set of linear rails and configured to translate along the translation axis of the linear rails; a third spool configured to removably mount to the frame in a first configuration and couple to the first actuator in a second configuration; and a fourth spool coupled to the set of linear rails and configured to translate along the translation axis of the linear rails; and a set of winches configured to couple to each of the frame, the first spool, and the fourth spool, the set of winches configured to regulate individual translation of the frame, the third spool, and the fourth spool along the set of linear rails. In an example, the first and second spools can each be static about the respective central axes, wherein the third and fourth spools are roller spools which are each rotatable about the respective central axis. Additionally, the set of actuators can include a yaw actuation mechanism which includes a hinge (e.g., with a vertical central axis, hinged in yaw) mounting a first end of the second spool and a second actuator coupled to a second end of the second spool. Additionally, the set of actuators can include an actuatable arm which is configured to transition a mount between a hardpoint and a launch position centered above a payload, wherein the hardpoint is located on the deck of the ship, adjacent to the first actuator, and the between the set of linear rails, the set of linear rails substantially parallel to along a long axis of the deck and extending past the hardpoint, wherein the mount is configured to selectively couple the base fitting to the hardpoint. For example, the arm can be hinged about an axis of rotation and raised/lowered using a set of winches, and/or can be hydraulically actuated. Additionally or alternatively, mount can be controllably articulated (e.g., in one or more direction) via a set of (rigging) lines and winches (e.g., which can be used to reposition the mount between the hardpoint and the launch position, without interfering with spools and/or spool frames).

However, the system can include any other suitable components.

4. Method.

The method, an example of which is shown in FIG. 2, can include: performing a balloon stand-up sequence S200. Additionally, the method can optionally include: performing an initialization sequence S100; positioning balloon base fitting above the capsule S300; and releasing the capsule S400. However, the method S100 can additionally or alternatively include any other suitable elements.

In variants, the method and/or each substep thereof may preferably be performed onboard the deck of a ship or other vehicle. For example, the method (and/or each substep thereof) can be performed while the ship is controlled to move with substantially the same velocity as the ambient wind, thereby minimizing the wind perturbation of the (upright) inflated portion of the balloon. Additionally or alternatively, the vehicle can be controlled to (coarsely) adjust heading, relative to a long axis of the balloon and/or vehicle, to match the wind direction (e.g., based on minor changes in ambient wind direction). Minimizing wind perturbations and adjusting heading (yaw) relative to the wind may help maintain the balloon alignment with the spool(s) during the method (and/or while the balloon is payed out during S200; with or without individual spool yaw adjustments). However, the method can additionally be performed on land and/or in any other suitable operational context(s).

Optionally performing an initialization sequence S100 functions to prepare the payload (capsule) and the balloon for balloon stand-up and/or deployment. S100 can include mounting the base fitting (e.g., to the deck). The base fitting can be mounted/attached using a quick release mechanism, bolted, clamped, or otherwise fastened via a rigid connection. The base fitting is preferably mounted to a hardpoint on the deck, but it can additionally or alternatively be attached to the end of a crane or arm, or otherwise configured. In variants, the base fitting can include or resemble the nadir fitting as described in U.S. application Ser. No. 17/162,151, filed 29 Jan. 2021, which is incorporated herein in its entirety by this reference. The base fitting is preferably pre-attached to the balloon and/or integrated into the assembled balloon structure and stored/packaged with the balloon, but it can alternatively be assembled locally or otherwise integrated with the balloon. In variants, the base fitting is preferably packed atop the stored balloon such that it is easily accessible and can be immediately accessed to facilitate attachment to the deck without unrolling/laying out the entire balloon, to allow controlled initialization/positioning of the balloon prior to launch.

Figure 4:
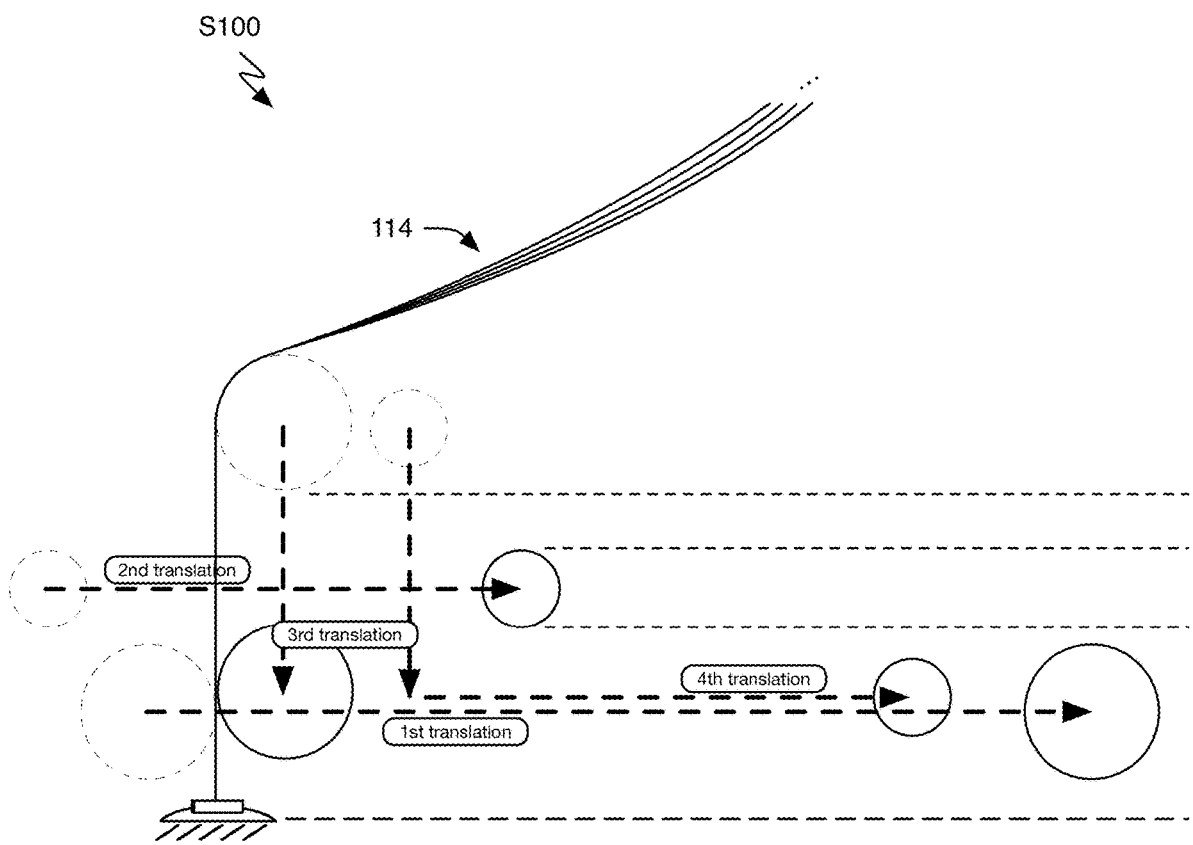
FIG. 4 is a schematic representation of spool translations in a variant of the method.

S100 can additionally include wrapping the deflated balloon through a series of spools which functions to position the balloon in the initial arrangement and/or maintain tension of the balloon prior to launch. Additionally or alternatively, wrapping the deflated balloon through the spools can 'control' the balloon (and/or a portion thereof) to avoid damage (e.g., which may otherwise result from incidental contact with the deck, wind disruption, and/or any problems arising from other external influences). This wrapping preferably occurs by a reverse stand-up sequence (e.g., translating the spools in the reverse order of operations, relative to the stand-up sequence as described in S200; an example is shown in FIG. 4, relative to the sequence illustrated in FIG. 6) with the balloon deflated. The deflated balloon can be partially wrapped around the spools (e.g., engaging each spool along a partial arc length of less than 1 wrap/circumference; partial wrap resembling a pulley coil angle; etc.), such as in a serpentine pattern (e.g., resembling a pulley system), but can alternatively be wrapped more than once around a spool (e.g., spiraling in a coil) and/or can be otherwise configured. In variants, wrapping the deflated balloon can facilitate controlling the entire (deflated) balloon on the deck prior to inflation of an initial volume of the balloon (and/or a wrapped portion thereof), which can avoid any dynamic effects associated with the balloon 'snapping' upward during initial inflation (e.g., which may tear the balloon) and/or during the stand-up sequence of S200.

Figure 5:
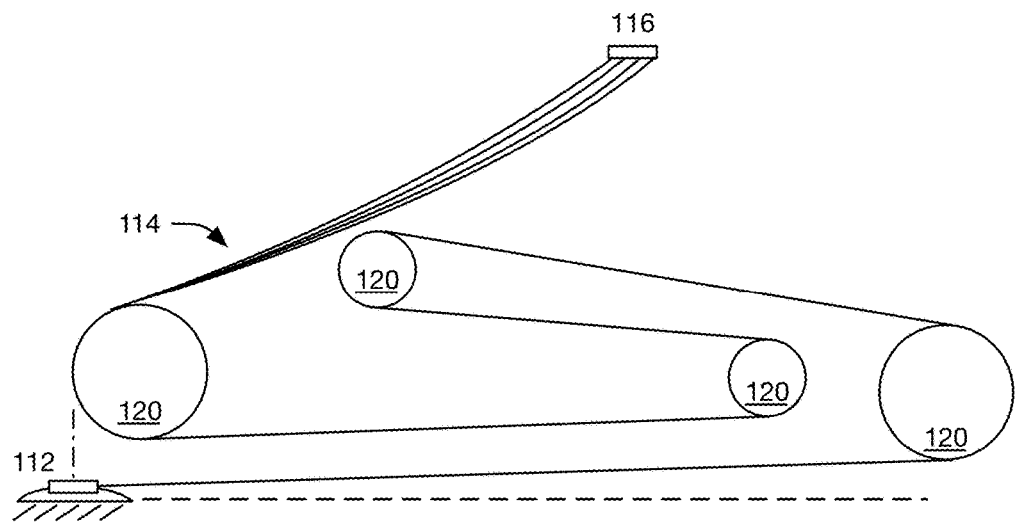
FIG. 5 is a schematic representation of an arrangement of spool positions for a wrapped balloon in a variant of the system and/or method.
Figure 12:
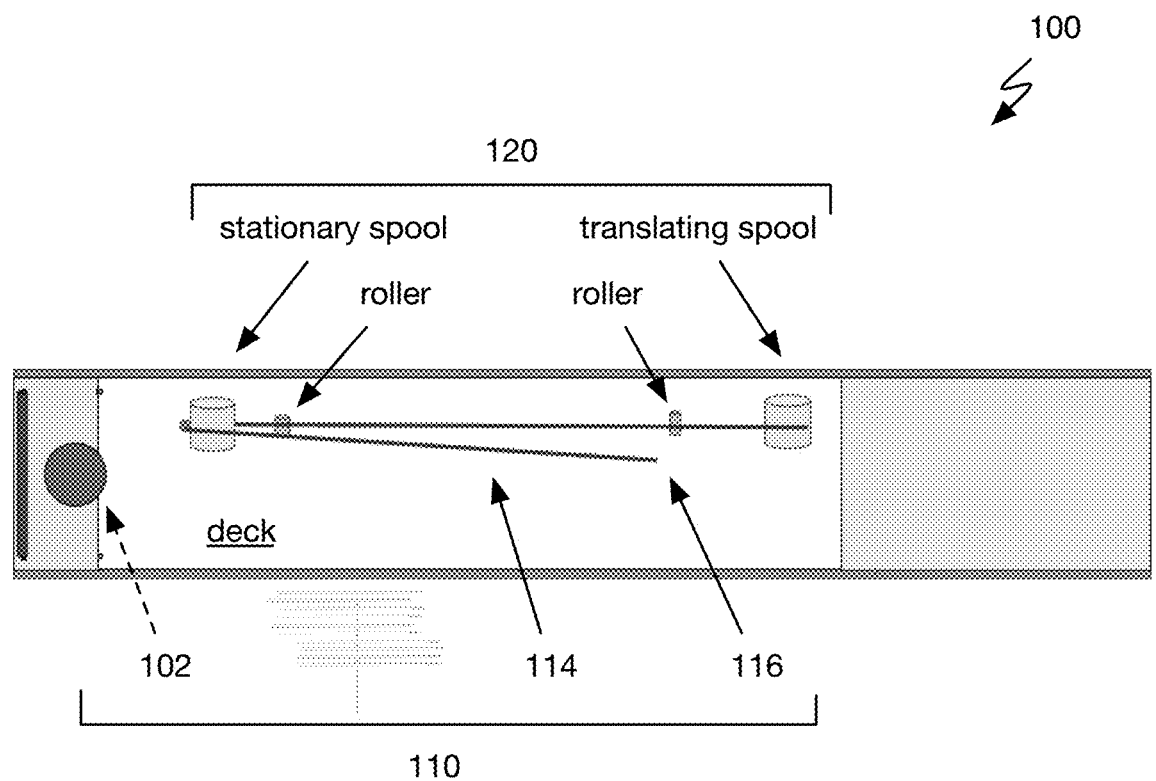
FIG. 12 is a schematic representation of a variant of the system.

In one example, S100 can wrap the balloon (e.g., under tension) through the series of spools in an initial position/configuration (e.g., an example is shown in FIG. 5; an example is illustrated in FIG. 15A; a second example is shown in FIG. 12).

In variants, S100 can additionally include preparation of the capsule for launch. For example, S100 can include: tethering the capsule to the base fitting (e.g., with a set of tethers, ropes, or cables), positioning the capsule in an initial position (e.g., adjacent to a base fitting mount/hardpoint on the deck), and/or any other suitable capsule preparations. In variants, the capsule can be fixedly mounted/attached to the deck and/or otherwise positioned retained on the deck (e.g., suspended from a crane, above a splash cone or stabilizer, etc.) in preparation for launch in accordance with Block S400.

However, the balloon system can be otherwise suitably initialized and/or can be otherwise arranged in the initial position prior to inflation and/or S200.

Performing a balloon stand-up sequence S200 functions to inflate the balloon envelope with a lift gas. Additionally or alternatively, the balloon stand-up sequence can reduce dynamic inflationary effects (e.g., the balloon 'snapping' open). S200 can include inflating the balloon, paying out the balloon (e.g., from the wraps/spools), sequentially releasing the balloon from the series of spools to unwrap the balloon, and/or any other suitable sub-steps. These sub-steps preferably occur simultaneously, concurrently, and/or repeatedly, but can additionally occur contemporaneously, continuously, over discrete intervals (e.g., at least partially asynchronously, contemporaneously), serially, and/or with any other suitable timing/frequency.

Inflating the balloon fills (e.g., partially fills) the envelope with a lift gas, such as hydrogen, preferably via a set of one or more fill tubes. The fill tubes can connect to the interior of the balloon envelope proximal to the free (apex) end of the balloon, causing the free (apex) end of the balloon to stand upright (e.g., substantially above the base fitting of the balloon fixed to the deck, where the closest contact point with a spool is above and vertically aligned with the base fitting; an example is shown in FIG. 3A). The balloon is preferably partially inflated during the stand-up sequence (e.g., where the balloon may expand and/or further inflate as it rises and the lift gas expands), but can be inflated with any other suitable volume/amount of lift gas during S200. In variants, the balloon can be inflated/filled substantially as described in U.S. application Ser. No. 17/162,151, filed 29 Jan. 2021, and/or U.S. application Ser. No. 17/164,668, filed 1 Feb. 2021, which is incorporated herein in its entirety by this reference.

As an example, in the initial position, the free (apex) end of the balloon is initially inflated from the deck (e.g., holding the apex fitting upright via a crane, with the apex fitting free, a portion of the balloon laid out along the deck, etc.), causing it to slowly transition to an upright orientation (e.g., an example is shown in FIG. 3A). Where the free end is a small fraction of the deflated balloon length (e.g., less than 10%, 10%, 20%, 25%, 30%, less than 50%, any open or closed range bounded by the aforementioned values, etc.; 62 feet, etc.), the free end may be (at least partially) inflated and may stand upright prior to paying out the remaining (wrapped) portion of the balloon. As an example, the remaining (deflated) portion of the balloon can be payed out and (at least partially) inflated with the balloon maintained in an upright position.

As a second example, inflating the apex portion of the balloon can include: raising the apex fitting with a crane; and providing the lift gas via the set of fill tubes, wherein buoyancy of the lift gas transitions the at least partially inflated apex portion to a substantially upright orientation.

Figure 3D:
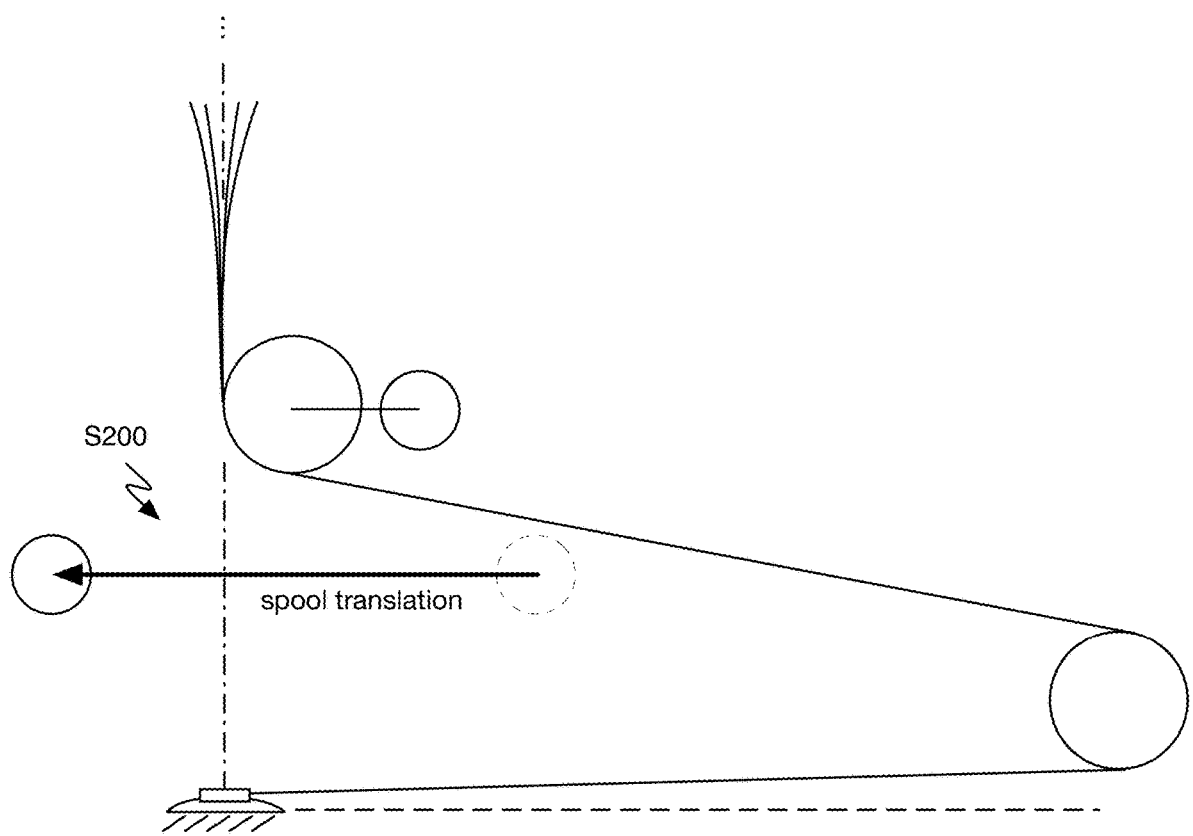
Figure 3E:
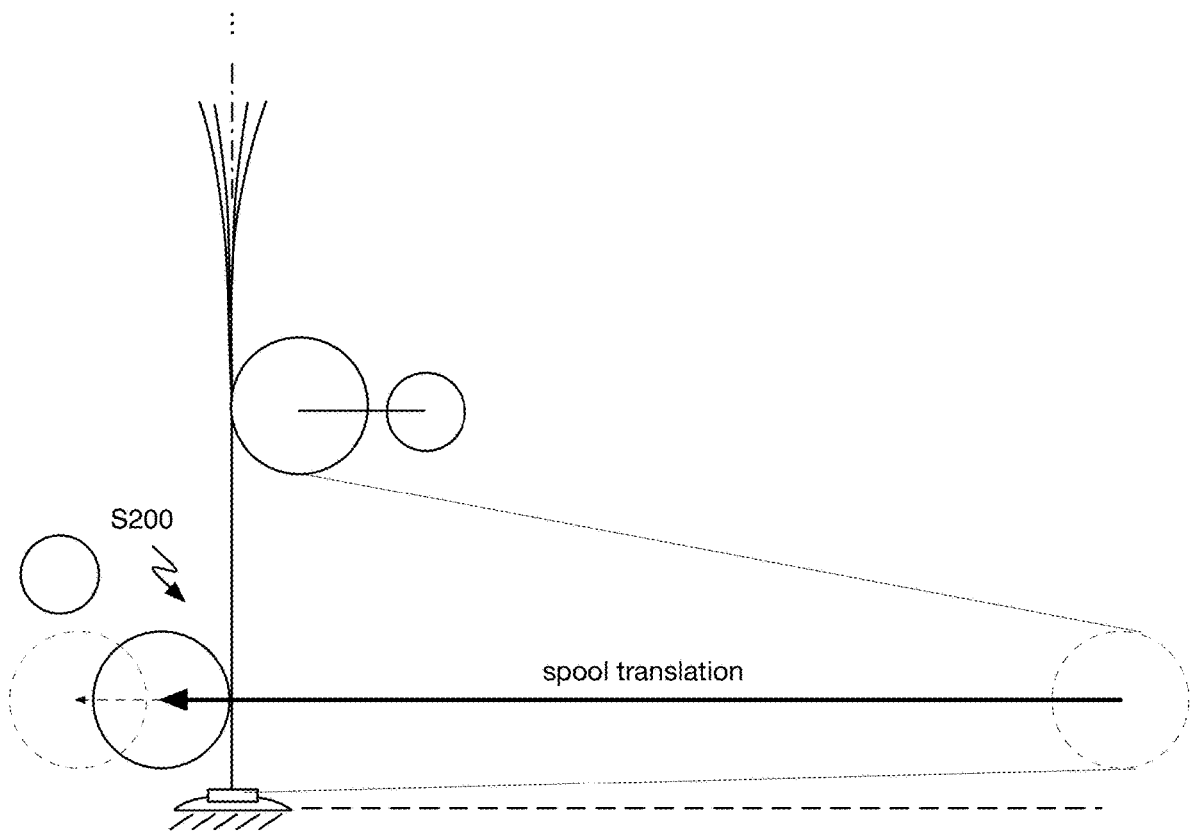
Figure 6:
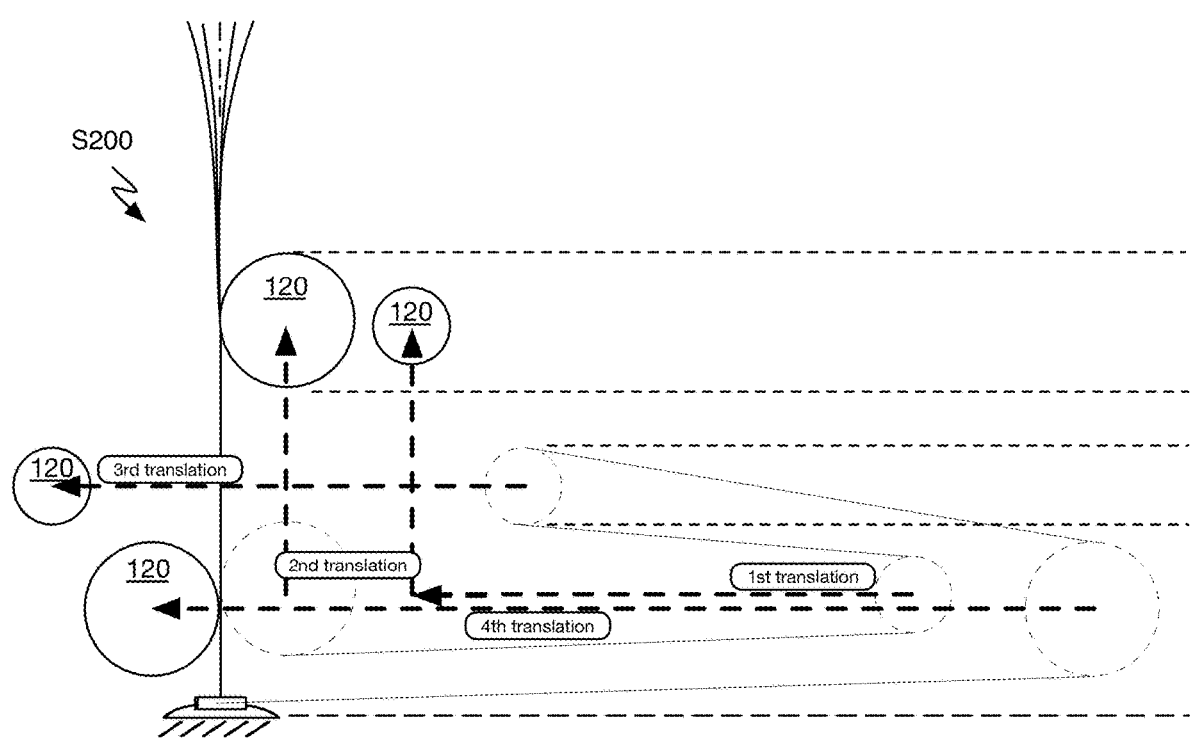
FIG. 6 is a schematic representation of a variant of S200.

Paying out the balloon functions to minimize dynamic effects (e.g., balloon snapping open) as the balloon inflates and the buoyancy increases (and resulting from the inflated volume of lift gas within the balloon envelope). The balloon is preferably payed out by gradually reducing the wrapped length of the uninflated balloon (e.g., length of balloon envelope which is wrapped, spooled, or controlled on the deck). The wrapped length can be reduced by translation of the spool(s). Preferably, the spools (e.g., distal the balloon and base fitting) are translated towards the base fitting (and/or past the base fitting along a longitudinal axis), thereby allowing the free (apex) end of the balloon and a proximal portion of the balloon to pay out (e.g., examples are shown in FIG. 3B, FIG. 3D, and FIG. 3E). For example, wherein the deflated balloon defines a reference manifold, each spool can be translated by normal force of the balloon at the bearing surface (at which the balloon contacts the spool) and/or along a path which does not intersect the reference manifold to pay out the balloon (e.g., examples are shown in FIGS. 3A-3E). As a second example, the balloon can be payed out by an ordered sequence of spool translations (e.g., an example is shown in FIG. 6).

The balloon is preferably payed out under the tensile force of the balloon, where tension in the balloon pulls a spool(s), driving translation of the spool(s) towards the base fitting and/or inflated portion of the balloon. Additionally or alternatively, the balloon can be payed out by direct actuation of spools (e.g., linear translation along a rail carriage), regulated by a winch, and/or otherwise controlled. An example of balloon contacts with an ordered series of spools is shown in FIG. 9.

In one set of variants (e.g., an example in FIG. 3E), S200 can include: controlling translation of a first spool towards the second spool along a translation axis; translating the first spool beneath the second spool along the translation axis; and offsetting the first spool on an opposite side of the hardpoint along the first axis relative to the second spool, thereby releasing the balloon engagement.

In one variant of the first set of variants, wherein, with the balloon deflated, the balloon defines a reference manifold and the series of spools further includes a third spool between the first and second spools in the series of spools (e.g., an example is shown in FIG. 3A), wherein paying out the balloon further includes: prior to controlling translation the first spool towards the second spool, controlling translation of the third spool along a path which does not intersect the reference manifold (e.g., towards the second spool; an example is shown in FIG. 3B); and subsequently, raising the third spool above a top plane of the first spool (e.g., an example is shown in FIG. 3C; as by collectively raising the second and third spools). For example, the third spool can be coupled with a support structure of the second spool (e.g., an H frame; telescoping arm; etc.), wherein S200 further includes actuating the support structure to raise both the third spool and the second spool above the top plane of the first spool.

In one variant of the first set of variants, wherein the series of spools further comprises a fourth spool between the first and second spools in the series of spools, wherein, with the balloon deflated, a top plane of the fourth spool is above a base plane of the second spool (e.g., an example is shown in FIG. 5), wherein paying out the balloon further includes raising the second spool above the top plane of the fourth spool to release the balloon from the fourth spool (e.g., an example is shown in FIG. 3C). As an example, the fourth spool can be translated past the second spool (and the base fitting) along the translation axis to avoid interference with the first spool.

In a second set of variants, S200 can include the transitions illustrated in the example shown in FIG. 6.

In a third set of variants, hard point H defines a reference coordinate frame along a vertical vector (v_z), upward from the base fitting, and a longitudinal vector (v_x). The balloon can be wrapped serially through spools A, B, C, and D, in an initial configuration (e.g., an example is shown in FIG. 9) with the spools arranged v_z: [H, A, D, C, B], v_x: [H, D, B, C, A]. S200 can sequentially transition through a series of configurations: v_z: [H, A, D, C, B], v_x: [H, D, C, B, A] (e.g., an example is shown in FIG. 3B); v_z: [H, A, B, D, C], v_x: [H, D, C, B, A] (e.g., an example is shown in FIG. 3C); v_z: [H, A, B, D, C], v_x: [B, H, D, C, A] (e.g., an example is shown in FIG. 3D); v_z: [H, A, B, D, C], v_x: [B, A, H, D, C] (e.g., an example is shown in FIG. 3E). Additionally or alternatively, the balloon can be transitioned through any liminal configurations (e.g., between aforementioned configurations), and/or any suitably subsets or permutations of the aforementioned configurations.

However, the balloon can be otherwise payed out during S200.

In variants, lateral forces and/or yaw of the balloon can be minimized by automatically or manually controlling the vessel/boat velocity to substantially match prevailing wind speed and/or direction during S200, which can reduce balloon perturbations (e.g., off of vertical and/or about a yaw axis) and axial forces which may affect the centering of the balloon along the spool(s) (e.g., which may result from wind gusts, particularly cross-wind; this may be pronounced for larger balloon sizes, such as utilized for stratospheric hydrogen balloons, which may be particularly sensitive to wind influence as they are payed out to greater heights). For example, S200 is preferably performed with the heading set to the wind direction and about 1 knot of speed difference between the vessel and the wind speed (e.g., maintaining positive pressure against the spool). Additionally or alternatively, the launch vessel velocity is preferably controlled to substantially match the wind velocity, but can be otherwise configured. Accordingly, in some variants, smaller vessels (e.g., with a shorter deck length than the balloon length) may be faster and/or more maneuverable and may thus accommodate a wider variety of wind conditions to increase launch opportunities (e.g., when compared to larger, slower moving, less maneuverable vessels).

Additionally, where the vessel may be relied upon to coarsely adapt to ambient wind (e.g., with yaw heading adjustment and/or a Z-drive/azimuthal control mechanism), yaw adjustment (e.g., manual, automatic, active, passive, etc.) of one or more spools may facilitate further (granular) centering along the axial length of the spool(s) during S200. Additionally, in variants the axial length of the spool(s) can exceed the uninflated/wrapped balloon width, which may accommodate axial translation of the balloon. For instance, the balloon width can vary from about 20 cm to about 2 meters (along various portions of the balloon; tapering towards the ends), where the spools and/or rollers may have an axial length of about 5 meters.

Figure 7:
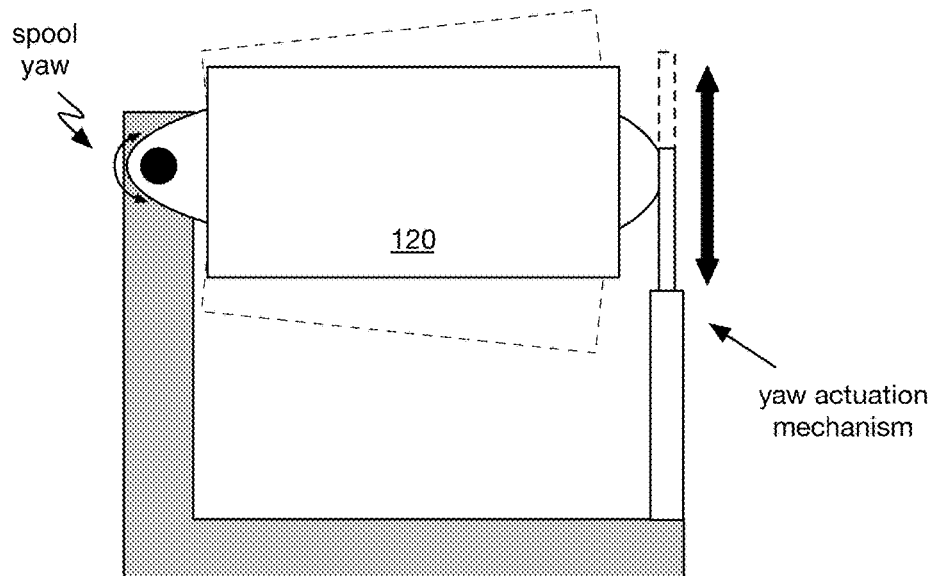
FIG. 7 is a schematic example of a yaw actuation mechanism in a variant of the system and/or method.
Figure 8:
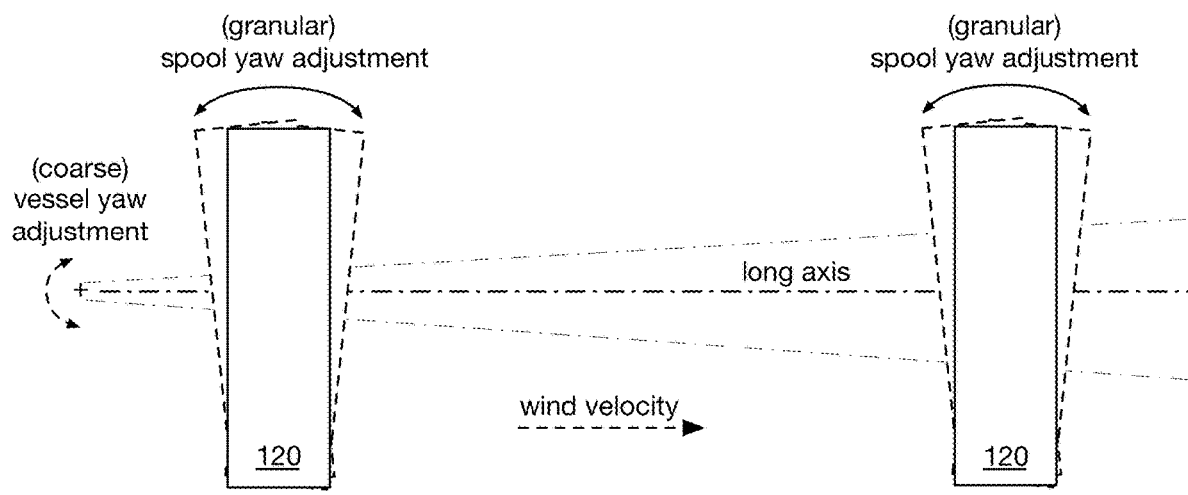
FIG. 8 is a schematic representation of yaw adjustment in one or more variants of the system and/or method.

In one variant, S200 can include: while paying out the balloon, adjusting a yaw angle of at least one of the spools about a respective vertical axis, which can maintain the balloon position relative to the width of the spool (e.g., as may accommodate axial deviations, such as due to changes in ambient wind direction or other lateral influences). For example, wherein each spool defines a central axis, the yaw angle of at least one spool (e.g., stationary spool; translating spool; roller spools; etc.) is controlled such that the central axis is substantially orthogonal to an ambient wind direction, wherein the adjusting the yaw angle can include: coarsely adjusting the yaw angle by controlling a vessel heading (e.g., via a vessel Z-drive, heading changes, etc.); and/or granularly adjusting the yaw angle by actuating the at least one spool relative to the deck (e.g., with a yaw actuation mechanism, an example is shown in FIG. 7 and FIG. 8). As a second example, concurrently with paying out the balloon under tension, the vessel can be controlled to substantially match the ambient wind velocity (e.g., average wind velocity; wind direction with about a 1 knot speed difference to maintain positive pressure, etc.). As a third example, one or more spools can be adjusted in yaw (e.g., about a vertical axis/hinge) to control the axial balloon position relative to the spool, such as to center the balloon relative to the axial length and/or avoid balloon interference with the edges of the spool(s) (and/or spool frame). For instance, spools can be individually adjusted in yaw by a yaw mechanism (e.g., an example is shown in FIG. 7), the yaw actuation mechanism comprising a hinge mounting a first end of the second spool and a second actuator (e.g., hydraulic piston etc.) coupled to a second end of the second spool, the hinge comprising a substantially vertical central axis.

However, the balloon and/or spools can be otherwise (laterally) adjusted during S200.

S200 can include sequentially releasing the balloon from the series of spools which functions to disengage the spool (s) as the balloon pays out and the wrapped, uninflated length of the balloon decreases. For example, releasing the balloon from a spool can reduce the number of times the balloon is doubled-back or coiled, and can reduce interference of the spool with the balloon (e.g., such that the spool does not contact the inflated portion of the balloon or restrict the remainder of the balloon from paying out).

The spools can be released/disengaged from the balloon by translating one or more spools (e.g., the spool, axle, and/or frame) away from portion of the balloon engaging the spool, and/or otherwise translating the spool(s). The spools are preferably translated via a set of actuatable arms, frames, and/or winches, however can be actuated by any suitable electrical, pneumatic, mechanical, manually-operated, or other actuation systems.

In one example, an upper spool (e.g., a lower portion of the spool contacting the balloon) can be released/disengaged by translating the spool axle/frame upwards, away from the balloon (e.g., an example translation is shown between FIG. 15B and FIG. 15C). In a second example, wherein a spool contacts the balloon along a first surface, the spool can be translated linearly along a translation vector (e.g., defined such that it extends from a center point of the axis of the spool, with length greater than the radius of the spool), wherein the translation vector does not intersect the contact area (an example is shown between FIGS. 15F and 15G). In a third example, spools not in contact with the balloon, but which are arranged between two portions of the balloon, can be translated/moved towards an opening between the two portions of the balloon (e.g., an example translation is shown between FIGS. 15D and 15E).

In one set of variants, the set of rollers can include a first spool (e.g., fixed spool), a second spool (e.g., a translating spool), a third spool (e.g., elevated roller), and a fourth spool (e.g., lower roller). The axes (and/or axles) of the spools are substantially parallel. In the initial position, the base fitting can be fixed to the deck, with the balloon serially contacting (in order starting from the base fitting) the fourth spool, the third spool, the second spool, and the first spool, wherein the free (apex) end extends beyond the first spool. After the free end of the balloon is at least partially inflated during S200 and stands upright, the free end contacts the first spool at a proximal end (e.g., proximal to the base fitting; directly above the base fitting; etc.). In the initial position: the second spool is arranged distal the first spool in a first longitudinal direction (e.g., at a distal end); the third spool is positioned longitudinally between the first and second spools, adjacent to the proximal end; and the fourth spool is positioned longitudinally between the second and third spools, adjacent to the distal end. The balloon can be payed out by translating the fourth spool (e.g., lower roller) longitudinally, toward the proximal end. As the balloon is payed out, the free (apex) end rises, while remaining substantially above the proximal end and/or first spool. The fourth spool is translated from its initial position towards the proximal end until it reaches a second position, between the first and third spools (e.g., an example is shown in FIG. 15B). With the fourth spool in the second position, the fourth spool can be arranged (vertically) above the wrapped portion of the balloon, releasing the contact between the fourth spool and with the balloon contacting the underside of both spools. As an example, the fourth spool can be detached from a frame and raised vertically (e.g., by an arm or other lifting mechanism). The fourth first and fourth spools can be raised (individually, collectively; automatically using an arm, manually by a crank, etc.) above the third spool, releasing the contact between the third spool and the balloon (e.g., where the balloon contact the first spool and the second spool, where a line tangent to both the first and second spools is vertically offset from the third spool and below the fourth spool; etc.). For example, the first spool can be mounted to the deck via a telescoping frame (e.g., manual, hydraulic, pneumatic, electromechanical, etc.), which can raise the axis of the second spool vertically relative to the deck/ground. An example of the third and fourth spools released from the frame is shown in FIG. 15C. The with the first and second spools controlling the (wrapped portion of) the balloon, the third spool (and/or translating frame of the fourth spool) can be removed (e.g., manually, automatically; translated in the same direction as the fourth spool between the initial position and the second position; by a lateral translation, parallel to the axes of the rollers; by an longitudinal translation, past the base fitting and the proximal end; an example is shown in FIG. 15D). The second spool can then be translated longitudinally towards (and beyond) the base fitting, to pay out the remainder of the balloon (e.g., examples are shown in FIGS. 15E-15G). As the balloon is payed out, the free (apex) end rises, while remaining substantially above the proximal end and/or first spool. The balloon can be inflated to the full launch capacity of the lift gas (e.g., fully inflated; partially inflated to a launch specification, where the lift gas may expand to fill the balloon in the stratosphere). In one such variant, an example stand-up sequence can include sequential translation of the fourth spool, the first spool, the third spool, and the second spool to facilitate the balloon unwrapping and/or paying out. The balloon can be inflated with the lift gas during any and/or all portions of the stand-up sequence (e.g., continuously, periodically, etc.).

Figure 13:
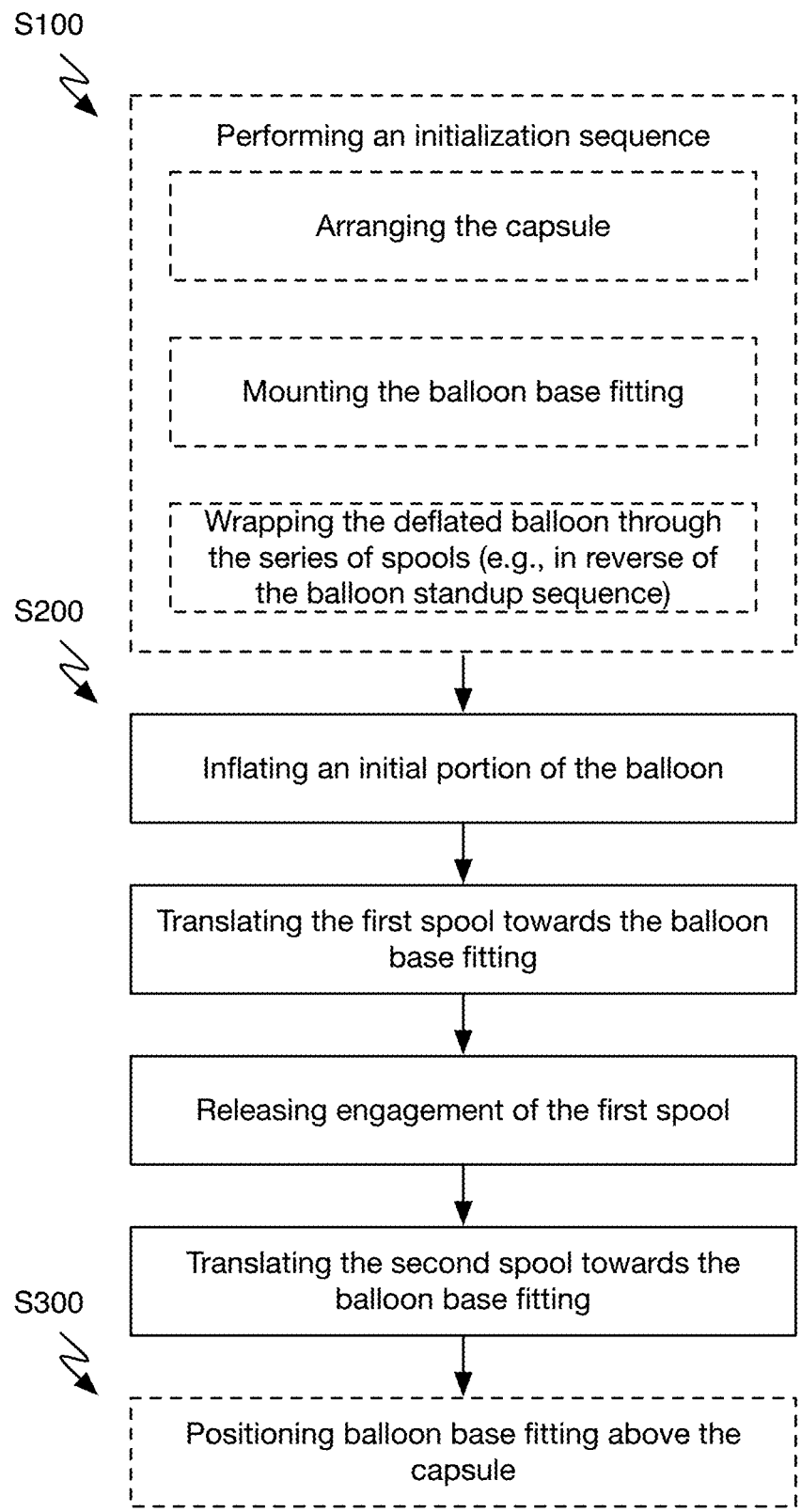
FIG. 13 is a flowchart diagrammatic representation of a variant of the method.

In one variant (e.g., an example is shown in FIG. 13), the balloon stand-up sequence can include: inflating an initial portion of the balloon, translating a first spool towards the base fitting, releasing engagement of the first spool, and translating a second spool towards the base fitting of the balloon.

In one variant, paying out the balloon (e.g., under tension of the apex portion) can include: controlling translation of the first spool towards the second spool along a translation axis; translating the first spool beneath the second spool along the translation axis; and offsetting the first spools on an opposite side of the hardpoint along the first axis relative to the second spool, thereby releasing the balloon engagement.

However, the balloon stand-up sequence can include any other suitable elements, and/or the balloon stand-up can be otherwise performed.

Optionally positioning the balloon base fitting above the capsule S300 functions to prepare the balloon for launch/release and/or mitigate the potential for dynamic effects (e.g., 'whiplash' on the capsule/balloon which may result if the base fitting were released from the deck in an uncontrolled manner). Additionally or alternatively, S300 can function to transition the base fitting above the capsule to fully stand-up the balloon and/or (pre-)tension the tether(s) between the balloon and the capsule.

The base fitting of the balloon is preferably positioned above the capsule by an actuation system, such as an arm, gantry, crane, rigging, or similar mechanism, which is configured to secure the base fitting while transforming it from the mounted position (e.g., hardpoint on the deck; initial position) to a launch position (e.g., directly above the capsule/payload; placing tethers in tension). For example, while the base fitting is mounted to the deck, the base fitting can additionally be connected to the actuation system (e.g., crane/arm), which may secure/retain the base fitting after the base fitting is decoupled from the deck (e.g., by disconnecting a quick release, removing a clevis pin, releasing a fastener, etc.). The actuation system can then control the transformation of the base fitting to the launch position. This transformation can be relatively slow (e.g., relative to the natural speed of such a transformation under the buoyant force of the balloon, if the base fitting were decoupled and free of any restraint of the arm; 10 seconds, 30 seconds, 1 minute, etc.), which may mitigate the dynamic effects of the balloon due to its buoyancy and (buoyant) potential energy.

In a first variant, a crane can be used to lift the base fitting from a storage container into the initial position and onto the deck (e.g., during S100), position the capsule on the deck (e.g., during S100), and/or position the base fitting above the capsule (e.g., during S300).

Figure 3F:
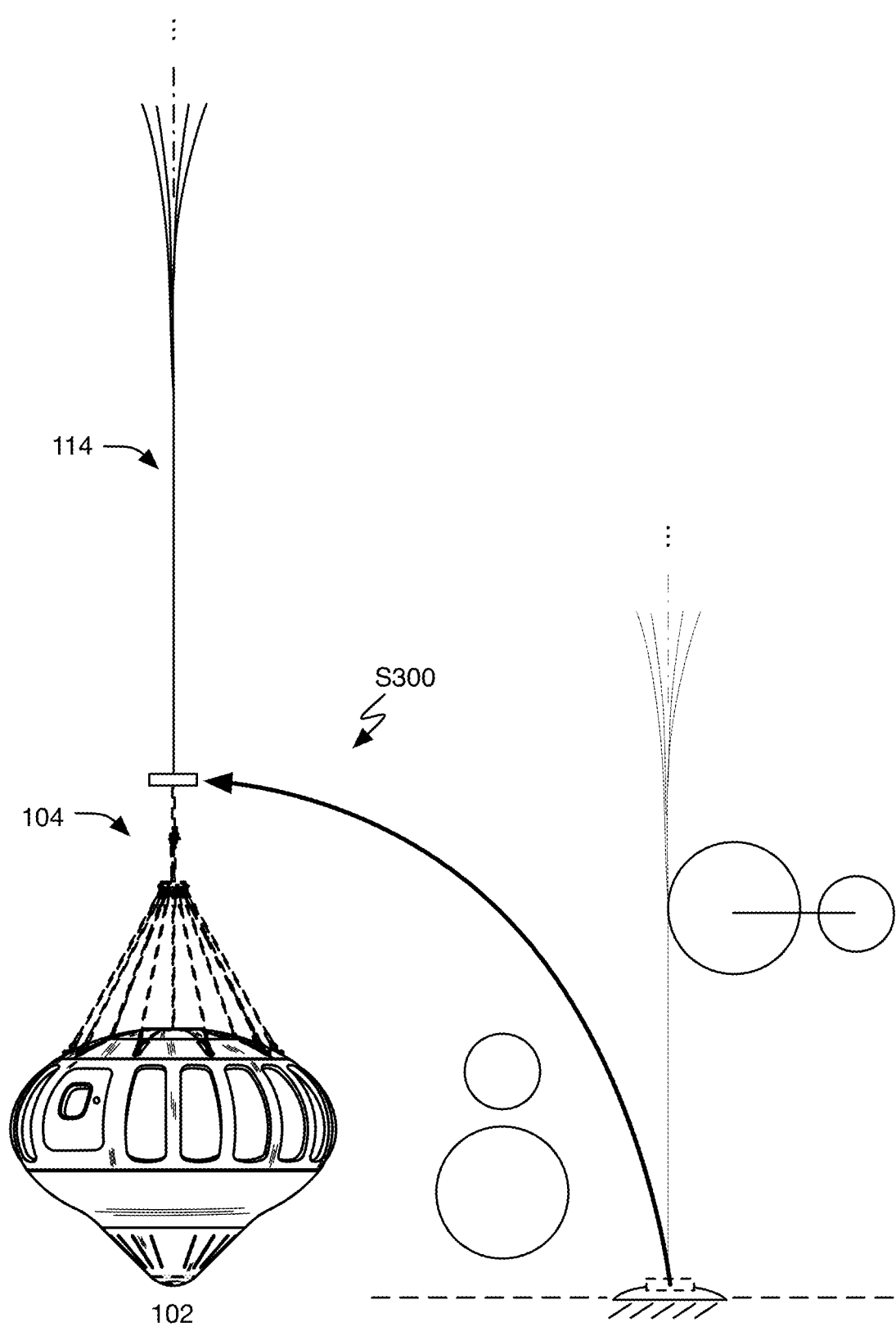
Figure 3G:
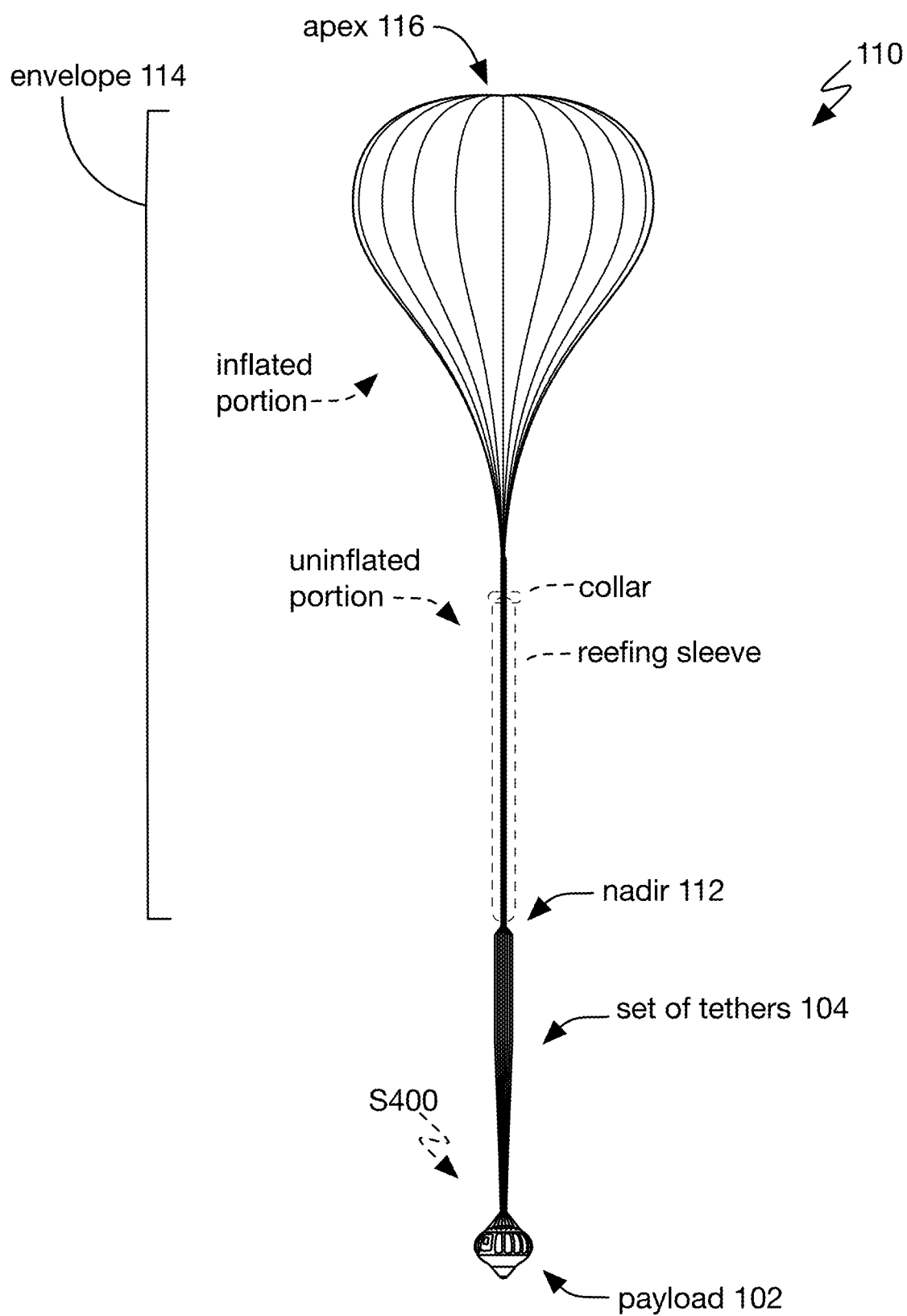

In a second variant, the base fitting can be decoupled from the deck mounting point after the balloon is (fully) payed out and can be controllably transitioned above the payload using an arm (e.g., single degree of freedom, multi-degree of freedom, etc.; hydraulic, controlled by a set of winches, etc.) during S300, transforming it from its initial position (e.g., fixed to the deck hardpoint) to a launch position (e.g., directly above the capsule, along a primary/vertical axis of the capsule and or balloon system; an example is shown in FIG. 3F and FIG. 3G). In a first example, the base fitting can be actively raised using an actuator (e.g., mechanical/hydraulic) of the arm. In a second example, the arm can be passively raised (e.g., relying on the balloon buoyancy) and controlled using a winch, ratcheting mechanical crank, or other release mechanism, which can be manually or automatically controlled. Alternatively, the base fitting can be repositioned above the payload using flexible rigging lines (e.g., adjustable length to constraining the mount/base fitting pose with lines held under tension from the balloon; controlled by a set of winches), without a rigid support arm.

However, the base fitting can be otherwise suitably positioned above the capsule.

Optionally releasing the capsule S400 functions to launch the balloon and/or capsule. Additionally or alternatively, S400 can function to facilitate balloon operation as described in U.S. application Ser. No. 17/162,151, filed 29 Jan. 2021, which is incorporated herein in its entirety by this reference. The capsule is preferably released and/or the balloon launched with the balloon standing upright above the capsule, after execution of the balloon stand-up sequence S200 (and after positioning the base fitting of the balloon above the capsule, in accordance with S300). The method, including S200 though capsule release/launch, preferably occurs during a (relatively) short window of time (e.g., less than 1 hour), which may reduce wind variation and/or vehicle compensation associated with wind (and wind changes) and/or capsule downtime (e.g., such that multiple capsules may be launched in a single day).

In variants, the capsule can be released by decoupling the capsule from the vehicle (e.g., deck; mount; etc.), releasing the base fitting, and/or otherwise releasing the balloon vehicle.

However, the capsule can be otherwise released with any other suitable timing.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising:
   mounting a base of a balloon;
   providing a first portion of lift gas through a fill tube of the balloon, wherein, while the first portion of lift gas is provided, the balloon contacts a plurality of spools between the base and the fill tube; and
   paying out the balloon, wherein paying out the balloon comprises translating a first spool of the plurality of spools under a second spool of the plurality of spools.

2. The method of claim 1, further comprising releasing the first spool from contact with the balloon.

3. The method of claim 2, wherein releasing the first spool from contact with the balloon comprises translating the first spool away from the second spool with the balloon between the first and second spools.

4. The method of claim 2, wherein mounting the base of the balloon comprises mounting the balloon to a fixture on a deck of a vessel, wherein the fixture defines a vertical axis orthogonal to the deck, wherein the translation of the first spool defines a translation axis and a reference plane orthogonal to the translation axis, wherein the reference plane comprises the vertical axis, wherein releasing the first spool from contact with the balloon comprises offsetting the first spool from the reference plane, opposite the second spool.

5. The method of claim 4, wherein the second spool is offset from the reference plane while the first portion of lift gas is provided.

6. The method of claim 1, further comprising, contemporaneously with paying out the balloon, adjusting a yaw angle of at least one of the spools about a respective vertical axis.

7. The method of claim 1, prior to providing the first portion of lift gas, wrapping the balloon through the plurality of spools.

8. The method of claim 7, wherein wrapping the balloon through the plurality of spools comprises a first ordered sequence of spool translations, wherein paying out the balloon defines a second ordered sequence of spool translations, wherein the first sequence is the reverse of the second sequence.

9. The method of claim 1, further comprising: raising an apex of the balloon with a crane prior to providing the first portion of lift gas through a fill tube, wherein buoyancy of the first portion of lift gas transitions an apex portion of the balloon to a substantially upright orientation.

10. The method of claim 9, wherein paying out the balloon occurs with the balloon in tension from the buoyancy of the first portion of lift gas.

11. The method of claim 10, wherein paying out the balloon further comprises a translation of the first spool which is controlled with a winch and driven by balloon tension.

12. The method of claim 1, wherein the balloon comprises a reefing sleeve, wherein, while the first portion of lift gas is provided, the reefing sleeve contacts at least one spool of the plurality of spools.

13. The method of claim 1, wherein the base of the balloon is mounted at a hardpoint, the method further comprising: after paying out the balloon, decoupling the base from the hardpoint and repositioning the base above a payload.

14. The method of claim 1, further comprising translating the base of the balloon away from the second spool.

15. The method of claim 1, wherein, while the first portion of lift gas is provided, the balloon is wrapped about the plurality of spools in a serpentine pattern.

16. The method of claim 1, wherein, while the first portion of lift gas is provided, the balloon is wrapped boustrophedonically between the plurality of spools.

17. A method of balloon standup, comprising:
wrapping a balloon through a plurality of spools by a first sequence of spool translations;
with the balloon wrapped through the plurality of spools, at least partially inflating the balloon with a lift gas; and
paying out the balloon by a second sequence of spool translations, wherein the second sequence is the reverse of the first sequence.

18. The method of claim 17, wherein the balloon is wrapped in a serpentine pattern.

19. The method of claim 17, further comprising: while paying out the balloon, adjusting a yaw angle of at least one spool about a respective vertical axis.

20. The method of claim 17, wherein the balloon comprises a collar configured to retain the lift gas proximal to an apex portion of the balloon, wherein the collar contacts a spool of the plurality of spools at a first time and at a second time, wherein the first time occurs during wrapping the balloon, wherein the second time occurs during paying out the balloon.

* * * * *